United States Patent
Peng et al.

(10) Patent No.: US 10,912,038 B2
(45) Date of Patent: Feb. 2, 2021

(54) UPLINK SCHEDULING METHOD AND APPARATUS

(71) Applicant: ZTE CORPORATION, Guangdong (CN)

(72) Inventors: Focai Peng, Guangdong (CN); Wei Gou, Guangdong (CN); Feng Bi, Guangdong (CN); Yajun Zhao, Guangdong (CN)

(73) Assignee: ZTE Corporation, Guangdong (CN)

( * ) Notice: Subject to any disclaimer, the term of this patent is extended or adjusted under 35 U.S.C. 154(b) by 40 days.

(21) Appl. No.: 16/071,432

(22) PCT Filed: Dec. 14, 2016

(86) PCT No.: PCT/CN2016/109948
§ 371 (c)(1),
(2) Date: Sep. 7, 2018

(87) PCT Pub. No.: WO2017/124861
PCT Pub. Date: Jul. 27, 2017

(65) Prior Publication Data
US 2019/0059057 A1  Feb. 21, 2019

(30) Foreign Application Priority Data
Jan. 20, 2016  (CN) .......................... 2016 1 0037437

(51) Int. Cl.
*H04W 52/14*  (2009.01)
*H04W 52/34*  (2009.01)
(Continued)

(52) U.S. Cl.
CPC ....... *H04W 52/146* (2013.01); *H04W 52/262* (2013.01); *H04W 52/325* (2013.01);
(Continued)

(58) Field of Classification Search
CPC .................................................. H04W 52/146
See application file for complete search history.

(56) References Cited

U.S. PATENT DOCUMENTS

| 2004/0029622 A1* | 2/2004 | Laroia .................... H04W 16/12 455/574 |
| 2005/0164741 A1* | 7/2005 | Rajkotia ............... H04W 68/00 455/561 |

(Continued)

FOREIGN PATENT DOCUMENTS

| CN | 102427608 A | 4/2012 |
| CN | 104917597 A | 4/2015 |

(Continued)

OTHER PUBLICATIONS

International Search Report dated Mar. 1, 2017 for International Application No. PCT/CN2016/109948, 5 pages.
(Continued)

*Primary Examiner* — Ankur Jain
(74) *Attorney, Agent, or Firm* — Knobbe, Martens, Olson & Bear, LLP (57) ABSTRACT

Provided is an uplink scheduling method and apparatus. The method includes that a User Equipment (UE) receives Downlink Control Information (DCI) sent by a base station, and the UE sends an uplink channel or/and an uplink signal and determines transmit power of the channel or/and the signal according to configuration information of the base station and the DCI.

6 Claims, 2 Drawing Sheets

Operate UE to receive DCI sent by a base station — S102

Operate the UE to send an uplink channel or/and an uplink signal and determine transmit power of the channel or/and the signal according to configuration information of the base station and the DCI — S104

(51) Int. Cl.
*H04W 52/36* (2009.01)
*H04W 52/26* (2009.01)
*H04W 52/32* (2009.01)
*H04W 72/04* (2009.01)

(52) U.S. Cl.
CPC ....... *H04W 52/346* (2013.01); *H04W 52/367* (2013.01); *H04W 72/042* (2013.01)

(56) References Cited

U.S. PATENT DOCUMENTS

| | | |
|---|---|---|
| 2015/0327189 A1 | 11/2015 | Seo et al. |
| 2015/0341866 A1 | 11/2015 | Park et al. |
| 2015/0351040 A1 | 12/2015 | Park et al. |
| 2015/0358916 A1 | 12/2015 | Park et al. |
| 2016/0353415 A1* | 12/2016 | Sarkar ................ H04W 72/042 |

FOREIGN PATENT DOCUMENTS

| | | |
|---|---|---|
| CN | 104956740 A | 9/2015 |
| CN | 105210430 A | 12/2015 |
| WO | 2014049169 A1 | 4/2014 |

OTHER PUBLICATIONS

Written Opinion of the International Searching Authority dated Mar. 1, 2017 for the International Application No. PCT/CN2016/109948, 4 pages.

* cited by examiner

UPLINK SCHEDULING METHOD AND APPARATUS

CROSS REFERENCE TO RELATED APPLICATIONS

This is a National Stage Application, filed under 35 U.S.C. 371, of International Patent Application No. PCT/CN2016/109948, filed on Dec. 14, 2016, which claims priority to Chinese patent application No. 201610037437.1 filed on Jan. 20, 2016, contents of all of which are incorporated herein by reference in their entireties.

TECHNICAL FIELD

The present disclosure relates to communications and, in particular, to an uplink scheduling method and apparatus.

BACKGROUND

In the related art, the 3rd Generation Partnership Project (3GPP) has completed the standardization work of Licensed Assisted Access (LAA) downlink communication (a base station sends and a User Equipment (UE) receives). In the coming period of time, the 3GPP will perform the standardization work of LAA uplink communication (the UE sends and the base station receives).

In LAA uplink communication, the UE needs to obtain the authorization (or configuration) of the base station before sending data (including channels and signals here). However, it has not been determined in the related art what the authorization information contains.

When the UE sends data, licensed carriers may be available and unlicensed carriers may also be available. Different channels and signals may exist on these carriers. However, it has not been determined in the related art how to allocate transmit power among carriers, how to allocate transmit power among channels (signals) and how the authorization information indicates transmit power.

The present disclosure has better performance in authorization information determination and transmit power allocation and indication.

SUMMARY

Embodiments of the present disclosure provide an uplink scheduling method and apparatus to have better performance in authorization information determination and transmit power allocation and indication.

According to an embodiment of the present disclosure, an uplink scheduling method is provided. The method includes:
operating a User Equipment (UE) to receive Downlink Control Information (DCI) sent by a base station; and
operating the UE to send an uplink channel or/and an uplink signal and determine transmit power of the channel or/and the signal according to configuration information of the base station and the DCI.

According to another embodiment of the present disclosure, an uplink scheduling apparatus, disposed in UE. The apparatus includes:
a receiving module, which is configured to receive Downlink Control Information (DCI) sent by a base station; and
a sending module, which is configured to send an uplink channel or/and an uplink signal and determine transmit power of the channel or/and the signal according to configuration information of the base station and the DCI.

Embodiments of the present disclosure further provide a computer storage medium, which is configured to store executable instructions for implementing the uplink scheduling method in the above embodiments.

Through embodiments of the present disclosure, a UE receives DCI sent by a base station, and the UE sends an uplink channel or/and an uplink signal and determines transmit power of the channel or/and the signal according to configuration information of the base station and the DCI. This has better performance in authorization information determination and transmit power allocation and indication and improves the Licensed Assisted Access.

BRIEF DESCRIPTION OF DRAWINGS

The accompanying drawings described herein are used to provide a further understanding of the present disclosure, and form a part of the present application. The exemplary embodiments and descriptions thereof in the present disclosure are used to explain the present disclosure and do not limit the present disclosure in an improper way. In the accompanying drawings.

DETAILED DESCRIPTION

The present disclosure will be detailed below with reference to the accompanying drawings in conjunction with the embodiments. If not in collision, the embodiments described herein and the features thereof may be combined with each other.

It is to be noted that the terms "first", "second" and the like in the description, claims and drawings of the present disclosure are used to distinguish between similar objects and are not necessarily used to describe a particular order or sequence.

Figure 1:
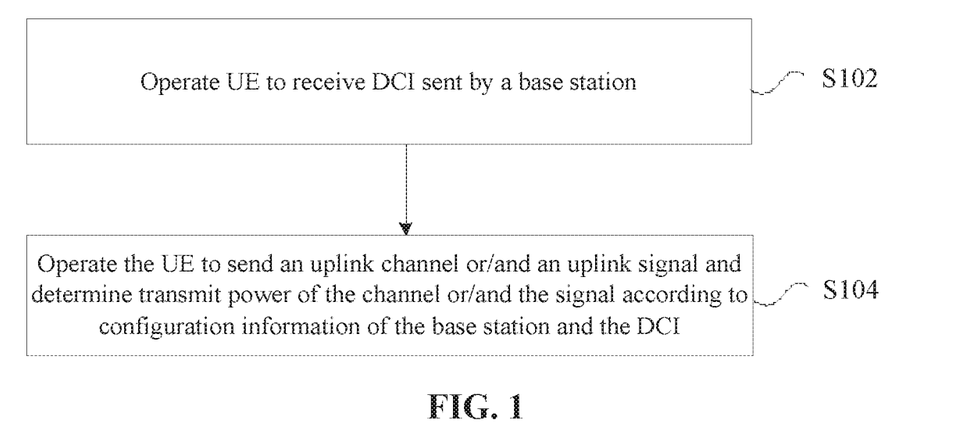
FIG. 1 is a flowchart of uplink scheduling according to an embodiment of the present disclosure.

This embodiment provides an uplink scheduling method. FIG. 1 is a flowchart of uplink scheduling according to an embodiment of the present disclosure. As shown in FIG. 1, the method includes the steps described below.

In step S102, a base station sends DCI to a UE.

In step S104, the UE sends an uplink channel or/and an uplink signal and determines transmit power of the channel or/and the signal according to configuration information of the base station and the DCI.

Through above steps, a UE receives DCI sent by a base station, and the UE sends an uplink channel or/and an uplink signal and determines transmit power of the channel or/and the signal according to configuration information of the base station and the DCI. This has better performance in authorization information determination and transmit power allocation and indication and improves the Licensed Assisted Access.

In an embodiment, the DCI includes: a bit for carrier indicator, a bit for resource block assignment, a bit for Transmit Power Control (TPC) command for scheduled Physical Uplink Shared Channel (PUSCH), a bit for cyclic shift for Demodulation Reference Signal (DM RS) and Orthogonal Cover Code (OCC) index, a bit for uplink index, a bit for Downlink Assignment Index (DAI), a bit for Hybrid Automatic Repeat Request (HARQ) process number, a bit for Channel State Information (CSI) request, a bit for Sounding Reference Symbol (SRS) request, a bit for resource allocation type, a bit for Modulation and Coding Scheme for a first transport block, a bit for new data indicator for the first transport block, a bit for Redundancy Version for the first transport block, a bit for Modulation and Coding Scheme for a second transport block, a bit for new data indicator for the second transport block, a bit for Redundancy Version for the second transport block, and a bit for precoding information and number of transmission layers.

In an embodiment, the DCI includes: the bit for carrier indicator, the bit for resource block assignment, the bit for TPC command for scheduled PUSCH, the bit for cyclic shift for DM RS and OCC index, the bit for uplink index, the bit for DAI, the bit for CSI request, the bit for SRS request, the bit for resource allocation type, a bit for HARQ process number for the first transport block, the bit for Modulation and Coding Scheme for the first transport block, the bit for new data indicator for the first transport block, the bit for Redundancy Version for the first transport block, a bit for HARQ process number for the second transport block, the bit for Modulation and Coding Scheme for the second transport block, the bit for new data indicator for the second transport block, the bit for Redundancy Version for the second transport block, and the bit for precoding information and number of transmission layers.

In an embodiment, the DCI includes: the bit for carrier indicator, the bit for resource block assignment, the bit for TPC command for scheduled PUSCH, the bit for cyclic shift for DM RS and OCC index, a bit for HARQ process number, the bit for resource allocation type, the bit for Modulation and Coding Scheme for the first transport block, the bit for new data indicator for the first transport block, the bit for Redundancy Version for the first transport block, the bit for Modulation and Coding Scheme for the second transport block, the bit for new data indicator for the second transport block, the bit for Redundancy Version for the second transport block, and the bit for precoding information and number of transmission layers.

In an embodiment, the DCI includes: the bit for carrier indicator, the bit for resource block assignment, the bit for TPC command for scheduled PUSCH, the bit for cyclic shift for DM RS and OCC index, the bit for HARQ process number, the bit for resource allocation type, the bit for Modulation and Coding Scheme for the first transport block, the bit for new data indicator for the first transport block, the bit for Redundancy Version for the first transport block, the bit for Modulation and Coding Scheme for the second transport block, the bit for new data indicator for the second transport block, the bit for Redundancy Version for the second transport block, the bit for precoding information and number of transmission layers, a bit for whether a SRS and a PUSCH are sent simultaneously, a bit for whether a Physical Uplink Control Channel (PUCCH) and the PUSCH are sent simultaneously, a bit for TPC command for the PUCCH when the PUCCH and the PUSCH are sent simultaneously, a bit for whether a Physical Random Access Channel (PRACH) and the PUSCH are sent simultaneously, and a bit for differentiation from DCI format 4.

In an embodiment, the DCI includes: the bit for carrier indicator, a bit for flag for DCI format0/format1A differentiation, a bit for frequency hopping flag, the bit for resource block assignment, a bit for Modulation and Coding Scheme, the bit for HARQ process number, a bit for new data indicator, a bit for Redundancy Version, the bit for TPC command for scheduled PUSCH, the bit for cyclic shift for DM RS and OCC index, the bit for uplink index, the bit for DAI, the bit for CSI request, the bit for SRS request, and the bit for resource allocation type.

In an embodiment, the DCI includes: the bit for carrier indicator, the bit for flag for DCI format0/format1A differentiation, the bit frequency hopping flag, the bit for resource block assignment, the bit for Modulation and Coding Scheme, the bit for HARQ process number, the bit for new data indicator, the bit for Redundancy Version, the bit for TPC command for scheduled PUSCH, the bit for cyclic shift for DM RS and OCC index, and the bit for resource allocation type.

In an embodiment, the DCI includes: the bit for carrier indicator, the bit for flag for DCI format0/format1A differentiation, the bit for frequency hopping flag, the bit for resource block assignment, the bit for Modulation and Coding Scheme, the bit for HARQ process number, the bit for new data indicator, the bit for TPC command for scheduled PUSCH, the bit for cyclic shift for DM RS and OCC index, and the bit for resource allocation type.

In an embodiment, the DCI includes: the bit for carrier indicator, the bit for flag for DCI format0/format1A differentiation, the bit for frequency hopping flag, the bit for resource block assignment, the bit for Modulation and Coding Scheme, the bit for HARQ process number, the bit for new data indicator, the bit for Redundancy Version, the bit for TPC command for scheduled PUSCH, the bit for cyclic shift for DM RS and OCC index, the bit for resource allocation type, the bit for whether the SRS and the PUSCH are sent simultaneously, the bit for whether the PUCCH and the PUSCH are sent simultaneously, the bit for TPC command for the PUCCH in simultaneous sending of the PUCCH and the PUSCH, the bit for whether the PRACH and the PUSCH are sent simultaneously, and the bit for differentiation from DCI format 0.

In an embodiment, the DCI includes: the bit for carrier indicator, the bit for resource block assignment, the bit for TPC command for scheduled PUSCH, the bit for cyclic shift for DM RS and OCC index, the bit for uplink index, the bit for DAI, the bit for CSI request, the bit for SRS request, the bit for resource allocation type, the bit for Modulation and Coding Scheme for the first transport block, the bit for new data indicator for the first transport block, the bit for Modulation and Coding Scheme for the second transport block, the bit for new data indicator for the second transport block, and the bit for precoding information and number of transmission layers.

In an embodiment, the DCI includes: the bit for carrier indicator, the bit for flag for DCI format0/format1A differentiation, the bit for frequency hopping flag, the bit for resource block assignment, the bit for Modulation and Coding Scheme, the bit for new data indicator, the bit for TPC command for scheduled PUSCH, the bit for cyclic shift for DM RS and OCC index, the bit for uplink index, the bit for DAI, the bit for CSI request, the bit for SRS request, and the bit for resource allocation type.

In an embodiment, the DCI includes: the bit for carrier indicator, the bit for resource block assignment, the bit for TPC command for scheduled PUSCH, the bit for cyclic shift for DM RS and OCC index, the bit for uplink index, the bit for DAI, the bit for HARQ process number, the bit for CSI request, the bit for SRS request, the bit for resource allocation type, the bit for Modulation and Coding Scheme for the first transport block, the bit for new data indicator for the first transport block, the bit for Modulation and Coding Scheme for the second transport block, the bit for new data indicator for the second transport block, and the bit the precoding information and number of transmission layers.

In an embodiment, the DCI includes: the bit for carrier indicator, the bit for flag for DCI format0/format1A differentiation, the bit for frequency hopping flag, the bit for resource block assignment, the bit for Modulation and Coding Scheme, the bit for HARQ process number, the bit for new data indicator, the bit for TPC command for scheduled PUSCH, the bit for cyclic shift for DM RS and OCC index, the bit for uplink index, the bit for DAI, the bit for CSI request, the bit for SRS request, and the bit for resource allocation type.

In an embodiment, the DCI includes: a bit for TPC command for the PUCCH.

In an embodiment, the DCI includes: the bit for TPC command for scheduled PUSCH.

After receiving the DCI, the UE first allocates transmit power to all channels or/and signals of a licensed carrier, and then allocates transmit power to all channels or/and signals of an unlicensed carrier.

The bit for carrier indicator has 0 bit or 3 bits or 5 bits or 6 bits.

0 bit indicates that no bit for carrier indicator exists.

If the UE supports more than 5 Component Carriers (CCs) or the UE supports up to 32 CCs, the base station may configure the bit for carrier indicator having 5 bits for the UE. If the UE supports cross-carrier retransmission, the base station may configure the bit for carrier indicator having 6 bits for the UE. Among the 6 bits of the bit for carrier indicator, 3 least significant bits are a serving cell index of a destination carrier, 3 most significant bits are a serving cell index of a source carrier. Data on the source carrier is retransmitted on the destination carrier during the cross-carrier retransmission.

The bit for resource block assignment has: (max(ceil(log 2(N_UL_RB×(N_UL_RB+1)/2)), ceil(log 2(Com(ceil(N_UL_RB/P+1), 4))))) bits. In this formula, max( ) denotes a larger one of two numbers, ceil( ) denotes a ceiling operation, log 2( ) denotes a logarithm to base 2, N_UL_RB denotes an uplink system bandwidth in units of resource blocks, Com(M, N) denotes a number of N-combinations from M numbers, where Com(M, N)=1 when M<N, and P denotes a size of a resource block group determined by the uplink system bandwidth, where when the uplink system bandwidth is 5 MHz, 10 MHz, 15 MHz and 20 MHz, a value of N_UL_RB is 25, 50, 75 and 100 respectively or is 25, 50, 75 and 110 respectively and a value of P is 2, 3, 4 and 4 respectively.

In an embodiment, the resource block assignment has: ceil(log 2(N_UL_RB×(N_UL_RB+1)/2)) bits.

The bit for TPC command for scheduled PUSCH has 2 bits.

The bit for cyclic shift for DM RS and OCC index has 3 bits.

The bit for uplink index has 0 bit or 2 bits. 0 bit indicates that no bit for uplink index exists.

The bit for DAI has 0 bit or 2 bits or 4 bits. 0 bits indicate that no bit for DAI exists.

The bit for HARQ process number for the first transport block, the bit for HARQ process number for the second transport block and the bit for HARQ process number each has 0 bit or 3 bits. 0 bit indicates that no such bit exists.

The bit for HARQ process number for the first transport block, the bit for HARQ process number for the second transport block and the bit for HARQ process number each has 0 bit or 4 bits. 0 bit indicates that no such bit exists.

The bit for CSI request has 0 bit or 1 bit or 2 bits or 3 bits. 0 bit indicates that no bit for CSI exists.

The bit for SRS request has 0 bit or 1 bit or 2 bits. 0 bit indicates that no bit for SRS exists.

The bit for resource allocation type has 0 bit or 1 bit. 0 bit indicates that no bit for resource allocation type exists.

The bit for Modulation and Coding Scheme for the first transport block, the bit for Modulation and Coding Scheme for the second transport block and the bit for Modulation and Coding Scheme each has 5 bits.

The bit for new data indicator for the first transport block, the bit for new data indicator for the second transport block and the bit for new data indicator each has 1 bit.

The bit for new data indicator for the first transport block or the bit for new data indicator for the second transport block or the bit for new data indicator having 1 bit indicates retransmission and new transmission. In an embodiment, a binary "0" indicates new transmission while a binary "1" indicates retransmission. In an embodiment, the binary "1" indicates new transmission while the binary "0" indicates retransmission.

The bit for Redundancy Version for the first transport block, the bit for Redundancy Version for the second transport block and the bit for Redundancy Version each has 0 bit or 1 bit or 2 bits. 0 bit indicates that no such bit exists.

The bit for precoding information and number of transmission layers has 3 bits in a case of 2 antenna ports and has 6 bits in a case of 4 antenna ports.

The bit for whether the SRS and the PUSCH are sent simultaneously has 0 bit or 1 bit. In a case of 0 bit, the bit for whether the SRS and the PUSCH are sent simultaneously does not exist; and in a case of 1 bit, a binary "1" indicates that the SRS and the PUSCH are sent simultaneously and a binary "0" indicates that the SRS and the PUSCH are not sent simultaneously.

The bit for whether the PUCCH and the PUSCH are sent simultaneously has 0 bit or 1 bit. In a case of 0 bit, the bit for whether the PUCCH and the PUSCH are sent simultaneously does not exist; and in a case of 1 bit, a binary "1" indicates that the PUCCH and the PUSCH are sent simultaneously and a binary "0" indicates that the PUCCH and the PUSCH are not sent simultaneously.

The bit for TPC command for PUCCH in simultaneous sending of the PUCCH and the PUSCH has 0 bit or 2 bits. In a case of 0 bit, the bit for TPC command for PUCCH in the simultaneous sending of the PUCCH and the PUSCH does not exist. When the bit for TPC command for PUCCH in the simultaneous sending of the PUCCH and the PUSCH is a binary "1", the bit for TPC command for PUCCH in the simultaneous sending of the PUCCH and the PUSCH is valid (meaningful); otherwise, the bit for TPC command for PUCCH in the simultaneous sending of the PUCCH and the PUSCH is invalid (meaningless).

The bit for whether the PRACH and the PUSCH are sent simultaneously has 0 bit or 1 bit. In a case of 0 bit, the bit for whether the PRACH and the PUSCH are sent simultaneously does not exist; and in a case of 1 bit, a binary "1" indicates that the PRACH and the PUSCH are sent simultaneously and a binary of "0" indicates that the PRACH and the PUSCH are not sent simultaneously.

The total bit length of the DCI is equal to the bit length of the DCI format 0.

If the total bit length of the DCI is equal to the bit length of the DCI format 0, one binary bit "0" is added to an end of the DCI.

The total bit length of the DCI is equal to the bit length of the DCI format 4.

If the total bit length of the DCI is equal to the bit length of either a DCI format 1 or 2 or 2A or 2B or 2C or 2D for downlink scheduling or the DCI format 4 uplink scheduling in a configured transmit mode in a same serving cell, one binary bit "0" is added to an end of the DCI.

The bit for differentiation from DCI format 4 has 0 bit or 1 bit. In a case of 0 bit, the bit for differentiation from DCI format 4 does not exist; and in a case of 1 bit, a binary "1" indicates that the DCI received by the UE is different from the DCI format 4 and a binary "0" indicates that the DCI received by the UE is the same as the DCI format 4.

The bit for differentiation from DCI format 0 has 0 bit or 1 bit. In a case of 0 bit, the bit for differentiation from DCI format 0 does not exist; and in a case of 1 bit, a binary "1" indicates that the DCI received by the UE is different from the DCI format 0 and a binary "0" indicates that the DCI received by the UE is the same as the DCI format 0.

In an embodiment, the bit for resource block assignment has: $(\max(\mathrm{ceil}(\log_2(N\_UL\_RB \times (N\_UL\_RB+1)/2)), \mathrm{ceil}(\log_2(\mathrm{Com}(\mathrm{ceil}(N\_UL\_RB/P+1), 4)))) - HARQ\_BIT)$ bits. In this formula, HARQ_BIT denotes a number of bits of the bit for HARQ process number or denotes a sum of a number of bits of the bit for HARQ process number for the first transport block and a number of bits of the bit for HARQ process number for the second transport block. In this case, a granularity of the resource block assignment is (2×P), (3×P), or 25 resource blocks, and a resource allocation mode of the resource blocks is a bitmap or is allocation of entire system bandwidth.

In an embodiment, the bit for resource block assignment has: $(\max(\mathrm{ceil}(\log_2(N\_UL\_RB \times (N\_UL\_RB+1)/2)), \mathrm{ceil}(\log_2(\mathrm{Com}(\mathrm{ceil}(N\_UL\_RB/P+1), 4)))) - HARQ\_BIT - RV\_BIT)$ bits. In this formula, RV_BIT denotes a sum of a number of bits of the bit for Redundancy Version for the first transport block and a number of bits of the bit for Redundancy Version for the second transport block. In this case, the granularity of the resource block assignment is (4×P), (5×P), or 25 resource blocks, and the resource allocation mode of the resource blocks is the bitmap or is the allocation of the entire system bandwidth.

In an embodiment, the bit for resource block assignment has: $(\mathrm{ceil}(\log_2(N\_UL\_RB \times (N\_UL\_RB+1)/2)) - HARQ\_BIT)$ bits. In this formula, HARQ_BIT denotes the number of bits of the bit for HARQ process number. In this case, the granularity of the bit for resource block assignment is (2×P), (3×P), or 25 resource blocks, and the resource allocation mode of the resource blocks is the bitmap or is the allocation of the entire system bandwidth.

In an embodiment, the resource block assignment occupies: $(\mathrm{ceil}(\log_2(N\_UL\_RB \times (N\_UL\_RB+1)/2)) - HARQ\_BIT - RV\_BIT)$ bits. In this formula, HARQ_BIT denotes the number of bits of the bit for HARQ process number, and RV_BIT denotes a number of bits of the bit for Redundancy Version. In this case, the granularity of the resource block assignment is (3×P), (4×P), (5×P), or 25 resource blocks, and the resource allocation mode of the resource blocks is the bitmap or is the allocation of the entire system bandwidth.

When the bit for Redundancy Version for the first transport block, the bit for Redundancy Version for the second transport block, or the bit for Redundancy Version has 0 bit, a Redundancy Version RV 0 is always used by the UE to send the PUSCH.

When the bit for Redundancy Version for the first transport block, the bit for Redundancy Version for the second transport block, or the bit for Redundancy Version has 1 bit, the Redundancy Version RV 0 and a Redundancy Version RV 2 are used by the UE to send the PUSCH. In other words, a binary "0" of the 1 bit indicates the RV 0 while a binary "1" of the 1 bit indicates the RV 2, or a Redundancy Version (2×Bit_RV) is used and Bit_RV denotes a value of the bit for Redundancy Version, or the binary "1" of the 1 bit indicates the RV 0 while the binary "0" of the 1 bit indicates the RV 2.

When the bit for Modulation and Coding Scheme for the first transport block or the bit for Modulation and Coding Scheme for the second transport block corresponds to a decimal 0 (that is, when each of 5 bits is a binary "0"), 29, 30 or 31, a corresponding transport block is prohibited from being sent.

When scheduling the PUSCH of the UE, the base station allocates 90, 96 or 100 resource blocks.

When the bit for whether the SRS and the PUSCH are sent simultaneously has 1 bit and is the binary "1", the SRS is configured to have a transmit bandwidth of 96 resource blocks.

When the bit for whether the PUCCH and the PUSCH are sent simultaneously has 1 bit and is the binary "1", the base station allocates 90 or 96 resource blocks to the PUSCH and allocates 5 or 2 resource blocks to the PUCCH at each of two side of a system bandwidth (the system bandwidth has a total of 10 or 14 resource blocks).

When the bit for whether the PRACH and the PUSCH are sent simultaneously has 1 bit and is the binary "1", the base station allocates 90 resource blocks to the PUSCH.

The configuration information of the base station includes: a serving cell index, whether a bit for carrier indicator exists, whether self-scheduling or cross-carrier scheduling, a maximum total transmit power for all unlicensed carriers, a maximum transmit power for each of the unlicensed carriers, configuration information of a Physical Uplink Control Channel (PUCCH), configuration information of a Sounding Reference Symbol (SRS), configuration information of a Physical Random Access Channel (PRACH), configuration information of a downlink transmit mode, configuration information of downlink scheduling, configuration information of an uplink transmit mode, configuration information of the DCI used for the uplink scheduling and monitored by the UE, an uplink system bandwidth, and a number of uplink transmit antenna ports.

The DCI includes: 4 bits for subframe configuration information for License Assisted Access (LAA); or the DCI comprises: 4 bits for subframe configuration information for the LAA, a bit for HARQ process number for a single UE or all UEs in a cell, and a reserved information bit.

A decimal value 14, that is, a binary value "1110" of the 4 bits for subframe configuration information for LAA indicates that a current subframe is an incomplete subframe of 12 Orthogonal Frequency Division Multiplexing (OFDM) symbols and a next subframe is an uplink subframe.

A decimal value 15, that is, a binary value "1111" of the 4 bits for subframe configuration information for LAA indicates that the current subframe is a complete subframe of 14 OFDM symbols and the next subframe is the uplink subframe.

The decimal value 14, that is, the binary value "1110" of the 4 bits for subframe configuration information for LAA indicates that the next subframe is the incomplete subframe of 12 OFDM symbols and a subframe subsequent to the next subframe is the uplink subframe.

The decimal value 15, that is, the binary value "1111" of the 4 bits for subframe configuration information for LAA indicates that the next subframe is the complete subframe of 14 OFDM symbols and the subframe subsequent to the next subframe is the uplink subframe.

The decimal value 14, that is, the binary value "1110" of the 4 bits for subframe configuration information for LAA indicates that the current subframe is an incomplete subframe of 11, 10, 9, 6 or 3 OFDM symbols and the next subframe is the uplink subframe.

The decimal value 14, that is, the binary value "1110" of the 4 bits for subframe configuration information for the indicates that the next subframe is the incomplete subframe of 11, 10, 9, 6 or 3 OFDM symbols and the subframe subsequent to the next subframe is the uplink subframe.

The decimal value 15, that is, the binary value "1111" of the 4 bits for subframe configuration information for LAA indicates that the current subframe is the incomplete subframe of 11, 10, 9, 6 or 3 OFDM symbols and the next subframe is the uplink subframe.

The decimal value 15, that is, the binary value "1111" of the 4 bits for subframe configuration information for LAA indicates that the next subframe is the incomplete subframe of 11, 10, 9, 6 or 3 OFDM symbols and the subframe subsequent to the next subframe is the uplink subframe.

If the bit for TPC command for PUCCH is delivered in a DCI format 1A, 1B, 1D, 1, 2A, 2, 2B, 2C or 2D of an unlicensed carrier, the bit for TPC command for PUCCH is valid for only the unlicensed carrier and is invalid for the PUCCH of a licensed carrier.

If the unlicensed carrier does not support the PUCCH and the bit for TPC command for PUCCH is delivered from the DCI format 1A, 1B, 1D, 1, 2A, 2, 2B, 2C or 2D of the unlicensed carrier, the bit for TPC command for PUCCH is reserved and the UE executes no operation.

If an unlicensed carrier has a common search space and supports a DCI format 3 or 3A, a TPC command delivered in the DCI format 3 or 3A acts on the PUCCH or/and the PUSCH of the unlicensed carrier.

The uplink channel or/and the uplink signal includes a Physical Uplink Shared Channel (PUSCH), a Physical Uplink Control Channel (PUCCH), a Physical Random Access Channel (PRACH), a Sounding Reference Symbol (SRS), a Demodulation Reference Signal (DM RS) and an uplink occupancy signal.

If the total bit length of the DCI is less than the bit length of the DCI format 4 for uplink scheduling in a configured transmit mode in a same serving cell, one or more binary bits "0" are added to an end of the DCI, so that the total bit length of the DCI is equal to the bit length the DCI format 4 for uplink scheduling in the configured transmit mode in the same serving cell.

If the total bit length of the DCI is less than the bit length of the DCI format 0 for uplink scheduling in a configured transmit mode in a same serving cell, one or more binary bits "0" are added to an end of the DCI, so that the total bit length of the DCI is equal to the bit length of the DCI format 0 for uplink scheduling in the configured transmit mode in the same serving cell.

In an embodiment, the bit for resource block assignment has: $(\max(\text{ceil}(\log 2(N\_UL\_RB \times (N\_UL\_RB+1)/2)), \text{ceil}(\log 2(\text{Com}(\text{ceil}(N\_UL\_RB/P+1), 4))))) - HARQ\_BIT - Reserve)$ bits. In this formula, HARQ_BIT denotes a number of bits of the bit for HARQ process number or denotes a sum of a number of bits of the bit for HARQ process number for the first transport block and a number of bits of the bit for HARQ process number for the second transport block, and Reserve denotes one or more reserved bits. In this case, a granularity of the resource block assignment is (2×P), (3×P), (4×P), or 25 resource blocks, and a resource allocation mode of the resource blocks is a bitmap or is allocation of entire system bandwidth.

In an embodiment, the bit for resource block assignment has: $(\max(\text{ceil}(\log 2(N\_UL\_RB \times (N\_UL\_RB+1)/2)), \text{ceil}(\log 2(\text{Com}(\text{ceil}(N\_UL\_RB/P+1), 4)))) - HARQ\_BIT - RV\_BIT - Reserve)$ bits. In this formula, RV_BIT denotes a sum of a number of bits of the bit for Redundancy Version for the first transport block and a number of bits of the bit for Redundancy Version for the second transport block, and Reserve denotes one or more reserved bits. In this case, a granularity of the resource block assignment is (4×P), (5×P), or 25 resource blocks, and a resource allocation mode of the resource blocks is a bitmap or is allocation of entire system bandwidth.

In an embodiment, the bit for resource block assignment has: $(\text{ceil}(\log 2(N\_UL\_RB \times (N\_UL\_RB+1)/2)) - HARQ\_BIT - Reserve)$ bits. In this formula, HARQ_BIT denotes the number of bits of the bit for HARQ process number, and Reserve denotes one or more reserved bits. In this case, a granularity of the resource block assignment is (2×P), (3×P), (4×P), or 25 resource blocks, and a resource allocation mode of the resource blocks is a bitmap or is allocation of entire system bandwidth.

In an embodiment, the bit for resource block assignment has: $(\text{ceil}(\log 2(N\_UL\_RB \times (N\_UL\_RB+1)/2)) - HARQ\_BIT - RV\_BIT - Reserve)$ bits. In this formula, HARQ_BIT denotes the number of bits of the bit for HARQ process number, RV_BIT denotes a number of bits of the bit for Redundancy Version, and Reserve denotes one or more reserved bits. In this case, a granularity of the resource block assignment is (3×P), (4×P), (5×P), or 25 resource blocks, and a resource allocation mode of the resource blocks is a bitmap or is allocation of entire system bandwidth.

The DCI includes: a bit for HARQ process number for a single UE or all UEs in a cell.

The bit for HARQ process number for the single UE or all UEs in the cell has 2 bits, 3 bits, 4 bits or 5 bits.

The UE acquires an HARQ process number, acquires other DCI according to one or more DCI described above and then sends the PUSCH according to the HARQ process number in conjunction with the other DCI.

The bit for CSI request and the bit for SRS request are concatenated to form the bit for HARQ process number. In this case, the UE sends using a fixed Redundancy Version or using a Redundancy Version acquired according to the bit for Modulation and Coding Scheme for the first transport block, the bit for Modulation and Coding Scheme for the second transport block or the bit for Modulation and Coding Scheme. The Redundancy Version may be fixed to RV 0.

The bit for CSI request and the bit for SRS request are concatenated to form the bit for HARQ process number and the bit for Redundancy Version. When the bit for CSI request and the bit for SRS request are concatenated to have a bit length less than a preset value L_Limit, no bit for Redundancy Version exists. In this case, the UE sends using the fixed Redundancy Version or using a Redundancy Version acquired according to the bit for Modulation and Coding Scheme for the first transport block, the bit for Modulation and Coding Scheme for the second transport block or the bit for Modulation and Coding Scheme. The Redundancy Version may be fixed to RV 0. The value of L_Limit is 1, 2, 3, 4 or 5. Generally, L_Limit=3.

When the bit for CSI request and the bit for SRS request are concatenated, the bit for CSI request is a Most Significant Bit (MSB) while the bit for SRS request is a Least Significant Bit (LSB).

When the bit for CSI request or/and the bit for SRS request are concatenated, the bit for CSI request is the LSB while the bit for SRS request is the MSB.

When the bit for CSI request has 1 bit and the bit for SRS request has 2 bits, the bit for HARQ process number formed by concatenating the bit for CSI request and the bit for SRS request has 3 bits and supports a maximum of 8 HARQ processes. When the bit for CSI request has 2 bits and the bit for SRS request has 2 bits, the bit for HARQ process number formed by concatenating the bit for CSI request and the bit for SRS request has 4 bits and supports a maximum of 16 HARQ processes. When the bit for CSI request has 1 bit and the bit for SRS request has 1 bit, the bit for HARQ process number formed by concatenating the bit for CSI request and the bit for SRS request has 3 bits and supports a maximum of 8 HARQ processes. When the bit for CSI request has 2 bits and the bit for SRS request has 0 bit, the bit for HARQ process number formed by concatenating the bit for CSI request and the bit for SRS request has 2 bits and supports a maximum of 4 HARQ processes. When the bit for CSI request has 1 bit and the bit for SRS request has 1 bit, the bit for HARQ process number formed by concatenating the bit for CSI request and the bit for SRS request has 2 bits and supports a maximum of 4 HARQ processes. When the bit for CSI request has 1 bit and the bit for SRS request has 0 bit, the bit for HARQ process number formed by concatenating the bit for CSI request and the bit for SRS request has 1 bit and supports a maximum of 2 HARQ processes.

The bit for Modulation and Coding Scheme for the first transport block, the bit for Modulation and Coding Scheme for the second transport block and the bit for Modulation and Coding Scheme indicate Redundancy Version information of respective resource blocks. When any of the bit for Modulation and Coding Scheme for the first transport block, the bit for Modulation and Coding Scheme for the second transport block or the bit for Modulation and Coding Scheme corresponds to a decimal value among 0 to 28, a corresponding Redundancy Version is 0, that is, RV 0. When any of the bit for Modulation and Coding Scheme for the first transport block, the bit for Modulation and Coding Scheme for the second transport block or the bit for Modulation and Coding Scheme corresponds to a decimal value of 29, the corresponding Redundancy Version is 1, that is, RV1. When any of the bit for Modulation and Coding Scheme for the first transport block, the bit for Modulation and Coding Scheme for the second transport block or the bit for Modulation and Coding Scheme corresponds to a decimal value of 30, the corresponding Redundancy Version is 2, that is, RV2. When any of the bit for Modulation and Coding Scheme for the first transport block, the bit for Modulation and Coding Scheme for the second transport block or the bit for Modulation and Coding Scheme correspond to a decimal value of 31, the corresponding Redundancy Version is 3, that is, RV3.

The bit for carrier indicator is used for indicating the HARQ process number, the bit for carrier indicator corresponds to a decimal value of the HARQ process number. When a carrier schedules the carrier itself (self-scheduling), the bit for carrier indicator having 3 bits or 5 bits corresponds to the decimal value of the HARQ process number. When the bit for carrier indicator has 5 bits and the carrier schedules the carrier itself (self-scheduling), 3 most significant bits or 3 least significant bits among the 5 bits of the bit for carrier indicator correspond to the decimal value of the HARQ process number. When the bit for carrier indicator has 5 bits and the carrier schedules the carrier itself (self-scheduling), 4 most significant bits or 4 least significant bits among the 5 bits of the bit for carrier indicator correspond to the decimal value of the HARQ process number.

The bit for cyclic shift for DM RS and OCC index is used for indicating the HARQ process number. The bit for cyclic shift for DM RS and OCC index having 3 bits corresponds to a decimal value of the HARQ process number, where the cyclic shift for DM RS and OCC index is fixed to 0 or a high-layer-configured parameter value cyclicShift; or 2 most significant bits or 2 least significant bits among the 3 bits of the bit or cyclic shift for DM RS and OCC index correspond to the decimal value of the HARQ process number, where the bit for cyclic shift for DM RS and OCC index is 0, 1 or the high-layer-configured parameter value cyclicShift; or 1 most significant bit or 1 least significant bit among the 3 bits of the bit for cyclic shift for DM RS and OCC index correspond to the decimal value of the HARQ process number, where the bit for cyclic shift for DM RS and OCC index is 0, 1, 2, 3 or the high-layer-configured parameter value cyclicShift.

1 bit or 2 bits of the bit for Modulation and Coding Scheme for the first transport block having 5 bits and 1 bit or 2 bits of the bit for Modulation and Coding Scheme for the second transport block having 5 bits serve as an HARQ process number. In this way, the bit for HARQ process number has 2 bits or 4 bits.

1 bit or 2 bits of the bit for Modulation and Coding Scheme having 5 bits serve as an HARQ process number. In this way, the HARQ process number has 1 bit or 2 bits.

In a case of 2 antenna ports, 2 bits or 3 bits of the bit for precoding information and number of transmission layers having 3 bits serve as an HARQ process number. In a case of 4 antenna ports, 2 bits or 3 bits or 4 bits of the bit for precoding information and number of transmission layers having 6 bits serve as an HARQ process number. In a case of 2 bits, 3 bits or 4 bits, 2 or 3 or 4 bits most significant bits among the 6 bits of the bit for precoding information and number of transmission layers serve as the HARQ process number or 2 or 3 or 4 least significant bits among the 6 bits of the bit for precoding information and number of transmission layers serve as the HARQ process number.

The bit for CSI request, the bit for SRS request and the bit for resource allocation type are concatenated to form the bit for HARQ process number. In this case, the UE sends using a fixed Redundancy Version or using a Redundancy Version acquired according to the bit for Modulation and Coding Scheme for the first transport block, the bit for Modulation and Coding Scheme for the second transport block or the bit for Modulation and Coding Scheme. The Redundancy Version may be fixed to RV 0.

The bit for CSI request, the bit for SRS request and the bit for resource allocation type are concatenated to form the bit for HARQ process number and the bit for Redundancy Version. When the bit for CSI request, the bit for SRS request and the bit for resource allocation type are concatenated to have a bit length less than a certain value L_Limit, no bit for Redundancy Version exists. In this case, the UE sends using the fixed Redundancy Version or using a Redundancy Version acquired according to the bit for Modulation and Coding Scheme for the first transport block, the bit for Modulation and Coding Scheme for the second transport block or the bit for Modulation and Coding Scheme. The Redundancy Version may be fixed to RV 0. The value of L_Limit is 1, 2, 3, 4 or 5. Generally, L_Limit=3.

The bit for CSI request is used for indicating the HARQ process number. The bit for CSI request having 1 bit or 2 bits or 3 bits corresponds to a decimal value of the HARQ process number. In this case, the CSI request is fixed to 0.

The bit for frequency hopping flag has 1 bit.

The bit for CSI request and the bit for frequency hopping flag are concatenated to indicate the HARQ process number. The bit for CSI request and the bit for frequency hopping flag are concatenated to have 2 bits or 3 bits or 4 bits and correspond to a decimal value of the HARQ process number. In this case, the bit for CSI request is fixed to 0 and the bit for frequency hopping flag is fixed to 0 (that is, no frequency hopping occurs).

The bit for CSI request is used for indicating a serving cell index of a source carrier; or the bit for cyclic shift for DM RS and OCC index is used for indicating the serving cell index of the source carrier; or the bit for precoding information and number of transmission layers is used for indicating the serving cell index of the source carrier; or the bit for uplink index and the bit for DAI are concatenated to indicate the serving cell index of the source carrier or the HARQ process number; or the bit for CSI request and the bit for SRS request are concatenated to indicate the serving cell index of the source carrier; or the bit for CSI request and the bit for frequency hopping flag are concatenated to indicate the serving cell index of the source carrier.

The DCI is sent on a first Control Channel Element (CCE) with an aggregation level of 4 or 8 in a common search space of an unlicensed carrier; or the DCI is sent on a second CCE with the aggregation level of 4 or 8 in the common search space of the unlicensed carrier; or the DCI is sent on a third or fourth CCE with the aggregation level of 4 in the common search space of the unlicensed carrier.

The DCI is sent on a first CCE with an aggregation level of 4 or 8 in a common search space of a licensed carrier; or the DCI is sent on a first, second, third or fourth CCE with the aggregation level of 4 in the common search space of the licensed carrier; or the DCI is sent on a first or second CCE with the aggregation level of 8 in the common search space of the licensed carrier.

The HARQ process number for the single UE or all UEs in the cell is carried by one or more Physical Hybrid Automatic Repeat Request Indicator Channels (PHICHs).

One PHICH carries 1-bit HARQ process number information, 3 PHICHs carry 3-bit HARQ process number information, 4 PHICHs carry 4-bit HARQ process number information, and 5 PHICHs carry 5-bit HARQ process number information.

In a case of the 3-bit HARQ process number information, a first bit is carried on a first PHICH group, a second bit is carried on a second PHICH group, and a third bit is carried on a third PHICH group. In an embodiment, in a case of more bits of HARQ process number information, these bits are evenly or alternately distributed over PHICH groups.

In a case of the 3-bit HARQ process number information, the 3-bit HARQ process number replaces 3 bits of a coded 1-bit HARQ Indicator (HI); or the 3 bits of the coded 1-bit HI are replaced with the 3-bit HARQ process number.

In a case of the 3-bit HARQ process number information, a first bit is carried on a first PHICH in a first PHICH group, where a channel number $n_{PHICH}^{Seq}$ is 0; a second bit is carried on a first PHICH in a second PHICH group, where the channel number $n_{PHICH}^{Seq}$ is 0; and a third bit is carried on a first PHICH in a third PHICH group, where the channel number $n_{PHICH}^{Seq}$ is 0.

Respective bits of HARQ process number information are fixed to respective PHICHs in respective PHICH groups.

The Mth bit of the HARQ process number is carried on a PHICH having a channel number $n_{PHICH}^{Seq}=(N_{ID}^{cell}+M-1) \mod(2 \cdot N_{SF}^{PHICH})$ in a PHICH group having a group number $n_{PHICH}^{group}=(N_{ID}^{cell}+M-1) \mod N_{PHICH}^{group}$. $N_{ID}^{cell}$ denotes a cell ID, mod denotes a modulo operation (a former number modulo a latter number), M is an integer, $N_{SF}^{PHICH}$ denotes a spreading factor of the PHICH, $N_{SF}^{PHICH}$ is 2 or 4, $N_{PHICH}^{group}$ denotes a number of PHICH groups, $N_{PHICH}^{group}=\text{Ceil}(N_g \cdot (N_{RB}^{DL}/8))$, Ceil( ) denotes a ceiling operation (for a minimal integer equal to or greater than the number), Ng is a parameter (configuration information) configured by the base station, Ng has a value range of {0, 1/6, 1/2, 1, 2}, $N_{RB}^{DL}$ denotes a downlink system bandwidth in units of resource blocks (configuration information), and $N_{RB}^{DL}$ has a value range of 6 to 110. $N_{ID}^{cell}$ is a Cell Radio Network Temporary Identifier (C-RNTI) of the UE when the HARQ process number is directed at the single UE.

The DCI includes a bit for Listen-Before-Talk (LBT) mode, and the bit for LBT mode has 2 bits.

When a transmit mode 3, 2 or 2A is configured for a Physical Uplink Shared Channel (PUSCH) of the UE, the UE monitors the DCI in one or more formats described above.

Embodiments of the present disclosure further provide an uplink scheduling apparatus for implementing the above-mentioned embodiment. What has been described will not be repeated. As used below, the term "module" may be software, hardware or a combination thereof capable of implementing preset functions. The apparatus in the embodiment described below is preferably implemented by software, but implementation by hardware or by a combination of software and hardware is also possible and conceived.

Figure 2:
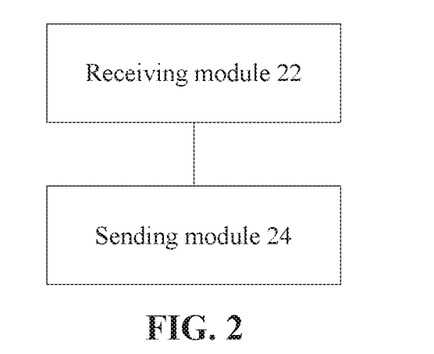
FIG. 2 is a block diagram illustrating a structure of an uplink scheduling apparatus according to an embodiment of the present disclosure.

FIG. 2 is a block diagram illustrating a structure of an uplink scheduling apparatus according to an embodiment of the present disclosure. As shown in FIG. 2, the apparatus includes a receiving module 22 and a sending module 24.

The receiving module 22 is configured to receive DCI sent by a base station; and The sending module 24 is connected to the receiving module 22 and configured to send an uplink channel or/and an uplink signal and determine transmit power of the channel or/and the signal according to configuration information of the base station and the DCI.

In this apparatus, a receiving module 22 is configured to receive DCI sent by a base station; and a sending module 24 is configured to send an uplink channel or/and an uplink signal and determine transmit power of the channel or/and the signal according to configuration information of the base station and the DCI. This has better performance in authorization information determination and transmit power allocation and indication and improves the Licensed Assisted Access.

The present disclosure will be detailed below in conjunction with preferred embodiments and implementation modes.

Preferred Embodiment 1

Below is description of an example of "an uplink system bandwidth of 20 MHz (100 RBs), cross-carrier scheduling, the bit for carrier indicator having 3 bits, 2 uplink transmit antenna ports, scheduling of 2 uplink transport blocks (TBs) (the 2 TBs each has an MCS greater than 0, that is, will not be prohibited), a maximum transmit power of 200 mW (i.e., 23 dBm), and sending on only an unlicensed carrier and not on a licensed carrier".

A base station sends DCI to a UE.

The DCI includes: a bit for carrier indicator having 3 bits, a bit for resource block assignment having 14 bits, a bit for TPC command for scheduled PUSCH having 2 bits, a bit for cyclic shift for DM RS and OCC index having 3 bits, a bit for uplink index having 0 bit (that is, no such bit exists), a bit for DAI having 0 bit (that is, no such bit exists), a bit for HARQ process number having 3 bits (an HARQ process number for an uplink PUSCH, similarly hereinafter), a bit for CSI request having 2 bits, a bit for SRS request having 2 bits, a bit for resource allocation type having 1 bit, a bit for Modulation and Coding Scheme for a first transport block having 5 bits, a bit for new data indicator for the first transport block having 1 bit, a bit for Redundancy Version for the first transport block having 2 bits, a bit for Modulation and Coding Scheme for a second transport block having 5 bits, a bit for new data indicator for the second transport block having 1 bit, a bit for Redundancy Version for the second transport block having 2 bits, and a bit for precoding information and number of transmission layers having 3 bits.

If the total bit length of the DCI is equal to the bit length of a DCI format 1, 2, 2A, 2B, 2C or 2D for downlink scheduling or a DCI format 4 for uplink scheduling in a configured transmit mode in a same serving cell (referring to the unlicensed carrier here), one binary bit "0" is added to an end of the DCI.

The UE sends the PUSCH on the unlicensed carrier according to configuration information (system bandwidth, antenna port, transmit power, transmit mode, etc.) of the base station and the DCI. The transmit power of the PUSCH does not exceed 200 mW.

It can be seen that this embodiment clarifies how to determine authorization information and how to allocate and indicate the transmit power of the UE.

Preferred Embodiment 2

Below is description of an example of "an uplink system bandwidth of 20 MHz (100 RBs), cross-carrier scheduling, the bit for carrier indicator having 3 bits, 2 uplink transmit antenna ports, scheduling of 2 uplink transport blocks (the 2 TBs each has an MCS greater than 0, that is, will not be prohibited), a maximum transmit power of 200 mW (i.e., 23 dBm), and sending on only an unlicensed carrier and not on a licensed carrier" for illustration.

A base station sends DCI to a UE.

The DCI includes: a bit for carrier indicator having 3 bits, a bit for resource block assignment having 14 bits, a bit for TPC command for scheduled PUSCH having 2 bits, a bit for cyclic shift for DM RS and OCC index having 3 bits, a bit for HARQ process number having 3 bits, a bit for resource allocation type having 1 bit, a bit for Modulation and Coding Scheme for a first transport block having 5 bits, a bit for new data indicator for the first transport block having 1 bit, a bit for Redundancy Version for the first transport block having 2 bits, a bit for Modulation and Coding Scheme for a second transport block having 5 bits, a bit for new data indicator for the second transport block having 1 bit, a bit for Redundancy Version for the second transport block having 2 bits, and a bit for precoding information and number of transmission layers having 3 bits.

If the total bit length of the DCI is equal to the bit length of a DCI format 1, 2, 2A, 2B, 2C or 2D for downlink scheduling or the DCI format 4 for uplink scheduling in a configured transmit mode in a same serving cell (referring to the unlicensed carrier here), one binary bit "0" is added to an end of the DCI.

The UE sends the PUSCH on the unlicensed carrier according to configuration information (system bandwidth, antenna port, transmit power, transmit mode, etc.) of the base station and the DCI. The transmit power of the PUSCH does not exceed 200 mW.

It can be seen that this embodiment clarifies how to determine authorization information and how to allocate and indicate the transmit power of the UE.

Preferred Embodiment 3

Below is description of an example of "an uplink system bandwidth of 20 MHz (100 RBs), cross-carrier scheduling, the bit for carrier indicator having 3 bits, 2 uplink transmit antenna ports, scheduling of 2 uplink transport blocks (the 2 TBs each has an MCS greater than 0, that is, will not be prohibited), a maximum transmit power of 200 mW (i.e., 23 dBm), and sending on only an unlicensed carrier and not on a licensed carrier".

A base station sends DCI to a UE.

The DCI includes: a bit for carrier indicator having 3 bits, a bit for resource block assignment having 14 bits, a bit for TPC command for scheduled PUSCH having 2 bits and used for indicating a change in transmit power of the PUSCH, a bit for cyclic shift for DM RS and OCC index having 3 bits, a bit for HARQ process number having 4 bits, a bit for resource allocation type having 1 bit, a bit for Modulation and Coding Scheme for a first transport block having 5 bits, a bit for new data indicator for the first transport block having 1 bit, a bit for Modulation and Coding Scheme for a second transport block having 5 bits, a bit for new data indicator for the second transport block having 1 bit, and a bit for precoding information and number of transmission layers having 3 bits.

Since there is no Redundancy Version information in the DCI, the UE always sends one or two transport blocks by using a fixed Redundancy Version, for example, Redundancy Version RV 0.

If the total bit length of the DCI is equal to the bit length of a DCI format 1, 2, 2A, 2B, 2C or 2D for downlink scheduling in a configured transmit mode in a same serving cell (referring to the unlicensed carrier here), one binary bit "0" is added to an end of the DCI.

In an embodiment, dispensably, if the total bit length of the DCI is equal to the bit length of a DCI format 4 for uplink scheduling in the configured transmit mode in the same serving cell (referring to the unlicensed carrier here), one binary bit "0" is added to the end of the DCI.

The UE sends the PUSCH on the unlicensed carrier according to configuration information (system bandwidth, antenna port, transmit power, transmit mode, etc.) of the base station and the DCI by using the Redundancy Version RV 0. The transmit power of the PUSCH does not exceed 200 mW.

It can be seen that this embodiment clarifies how to determine authorization information and how to allocate and indicate the transmit power of the UE.

Preferred Embodiment 4

Below is description of an example of "an uplink system bandwidth of 20 MHz (100 RBs), cross-carrier scheduling, the bit for carrier indicator having 3 bits, 2 uplink transmit antenna ports, scheduling of 2 uplink transport blocks (the 2 TBs each has an MCS greater than 0, that is, will not be prohibited), a maximum transmit power of 200 mW (i.e., 23 dBm), sending on only an unlicensed carrier and not on a licensed carrier, Reserve=1, a granularity of resource block assignment of 3×P, and a resource allocation mode of a bitmap".

A base station sends DCI to a UE.

The DCI includes: a bit for carrier indicator having 3 bits, a bit for resource block assignment (the number of bits of the bit for resource block assignment is described in the next paragraph), a bit for TPC command for scheduled PUSCH having 2 bits and used for indicating a change in transmit power of the PUSCH, a bit for cyclic shift for DM RS and OCC index having 3 bits, a bit for HARQ process number having 3 bits, a bit for resource allocation type having 1 bit, a bit for Modulation and Coding Scheme for a first transport block having 5 bits, a bit for new data indicator for the first transport block having 1 bit, a bit for Modulation and Coding Scheme for a second transport block having 5 bits, a bit for new data indicator for the second transport block having 1 bit, and a bit for precoding information and number of transmission layers having 3 bits.

In the last paragraph, the bit for resource block assignment has: Max(ceil(log 2(N_UL_RB×(N_UL_RB+1)/2)), ceil(log 2(Com(ceil(N_UL_RB/P+1), 4))))))–HARQ_BIT–Reserve=max(13, 14)–3–1=10 bits. In this formula, HARQ_BIT denotes the number of bits of the bit for HARQ process number, and Reserve denotes one or more reserved bits. In this case, the granularity of resource block assignment is 3×P=3×4=12 resource blocks, and the resource allocation mode is the bitmap.

Reserve may be used for distinguishing between the present DCI and a DCI format 4 (the value "1" of Reserve indicates the present DCI and the value "0" of Reserve indicates the DCI format 4). Reserve may also be used for distinguishing between the present DCI and a DCI format 0 (the value "1" of Reserve indicates the present DCI and the value "0" of Reserve indicates the DCI format 0).

Since there is no Redundancy Version information in the DCI, the UE always sends one or two transport blocks by using a fixed Redundancy Version, for example, Redundancy Version RV 0.

If the total bit length of the DCI is equal to the bit length of a DCI format 1, 2, 2A, 2B, 2C or 2D for downlink scheduling in a configured transmit mode in a same serving cell (referring to the unlicensed carrier here), one binary bit "0" is added to an end of the DCI.

If the total bit length of the DCI is less than the bit length of the DCI format 4 for uplink scheduling in the configured transmit mode in the same serving cell (referring to the unlicensed carrier here), one or more binary bits "0" are added to the end of the DCI, so that the total bit length of the DCI is equal to the bit length of the DCI format 4 for uplink scheduling in the configured transmit mode.

The UE sends the PUSCH on the unlicensed carrier according to configuration information (system bandwidth, antenna port, transmit power, transmit mode, etc.) of the base station and the DCI by using the Redundancy Version RV 0. The transmit power of the PUSCH does not exceed 200 mW.

It can be seen that this embodiment clarifies how to determine authorization information and how to allocate and indicate the transmit power of the UE.

Preferred Embodiment 5

Below is description of an example of "an uplink system bandwidth of 20 MHz (100 RBs), cross-carrier scheduling, the bit for carrier indicator having 3 bits, 2 uplink transmit antenna ports, scheduling of 2 uplink transport blocks (the 2 TBs each has an MCS greater than 0, that is, will not be prohibited), a maximum transmit power of 200 mW (i.e., 23 dBm), and sending on only an unlicensed carrier and not on a licensed carrier".

A base station sends DCI to a UE.

The DCI includes: a bit for carrier indicator having 3 bits, a bit for resource block assignment having 14 bits, a bit for TPC command for scheduled PUSCH having 2 bits and used for indicating a change in transmit power of the PUSCH, a bit for cyclic shift for DM RS and OCC index having 3 bits, a bit for uplink index having 0 bit (that is, no such bit exists), a bit for DAI having 0 bit (that is, no such bit exists), a bit for CSI request having 2 bits (whose meaning is described in the next paragraph), a bit for SRS request having 2 bits (whose meaning is described in the next paragraph), a bit for resource allocation type having 1 bit, a bit for Modulation and Coding Scheme for a first transport block having 5 bits, a bit for new data indicator for the first transport block having 1 bit, a bit for Modulation and Coding Scheme for a second transport block having 5 bits, a bit for new data indicator for the second transport block having 1 bit, and a bit for precoding information and number of transmission layers having 3 bits.

The bit for CSI request having 2 bits and the bit for SRS request having 2 bits described in the last paragraph are concatenated to obtain 4 bits. The 4 bits are used as the bit for HARQ process number and is thus capable of supporting 16 HARQ processes.

Since there is no Redundancy Version information in the DCI, the UE always sends one or two transport blocks by using a fixed Redundancy Version (for example, Redundancy Version RV 0).

If the total bit length of the DCI is equal to the bit length of a DCI format 1, 2, 2A, 2B, 2C or 2D for downlink scheduling in a configured transmit mode in a same serving cell (referring to the unlicensed carrier here), one binary bit "0" is added to an end of the DCI.

If the total bit length of the DCI is less than the bit length of the DCI format 4 for uplink scheduling in the configured transmit mode in a same serving cell (referring to the unlicensed carrier here), one or more binary bits "0" are added to the end of the DCI, so that the total bit length of the DCI is equal to the bit length of the DCI format 4 for uplink scheduling in the configured transmit mode.

The UE sends the PUSCH on the unlicensed carrier according to configuration information (system bandwidth, antenna port, transmit power, transmit mode, etc.) of the base station and the DCI by using the Redundancy Version RV 0. The transmit power of the PUSCH does not exceed 200 mW.

It can be seen that this embodiment clarifies how to determine authorization information and how to allocate and indicate the transmit power of the UE.

Preferred Embodiment 6

Below is description of an example of "an uplink system bandwidth of 20 MHz (100 RBs), cross-carrier scheduling, the bit for carrier indicator having 3 bits, 2 uplink transmit antenna ports, scheduling of 2 uplink transport blocks (the 2 TBs each has an MCS greater than 0, that is, will not be prohibited), a maximum transmit power of 200 mW (i.e., 23 dBm), sending on only an unlicensed carrier and not on a licensed carrier, and the use of the 3 most significant bits among bits formed by concatenating a bit for CSI request and a bit for SRS request as a bit for HARQ process number".

A base station sends DCI to a UE.

The DCI includes: a bit for carrier indicator having 3 bits, a bit for resource block assignment having 14 bits, a bit for TPC command for scheduled PUSCH having 2 bits and used for indicating a change in transmit power of the PUSCH, a bit for cyclic shift for DM RS and OCC index having 3 bits, a bit for uplink index having 0 bit (that is, no such bit exists), a bit for DAI having 0 bit (that is, no such bit exists), a bit for CSI request having 2 bits (whose meaning is described in the next paragraph), a bit for SRS request having 2 bits (whose meaning is described in the next paragraph), a bit for resource allocation type having 1 bit, a bit for Modulation and Coding Scheme for a first transport block having 5 bits, a bit for new data indicator for the first transport block having 1 bit, a bit for Modulation and Coding Scheme for a second transport block having 5 bits, a bit for new data indicator for the second transport block having 1 bit, and a bit for precoding information and number of transmission layers having 3 bits.

The bit for CSI request having 2 bits and the bit for SRS request having 2 bits described in the last paragraph are concatenated to obtain 4 bits. The 3 most significant bits among the 4 bits are used as the bit for HARQ process number and are thus capable of supporting 8 HARQ processes. The 1 least significant bit among the 4 bits is used as Redundancy Version information and is thus capable of supporting 2 Redundancy Versions (for example, RV 0 and RV 2). 2 transport blocks use the same Redundancy Version.

If the total bit length of the DCI is equal to the bit length of a DCI format 1, 2, 2A, 2B, 2C or 2D for downlink scheduling in a configured transmit mode in a same serving cell (referring to the unlicensed carrier here), one binary bit "0" is added to an end of the DCI.

If the total bit length of the DCI is less than the bit length of the DCI format 4 for uplink scheduling in the configured transmit mode in a same serving cell (referring to the unlicensed carrier here), one or more binary bits "0" are added to the end of the DCI, so that the total bit length of the DCI is equal to the bit length of the DCI format 4 for uplink scheduling in the configured transmit mode.

The UE sends the PUSCH on the unlicensed carrier according to configuration information (system bandwidth, antenna port, transmit power, transmit mode, etc.) of the base station and the DCI by using the Redundancy Version RV 0 or RV 2. The transmit power of the PUSCH does not exceed 200 mW.

It can be seen that this embodiment clarifies how to determine authorization information and how to allocate and indicate the transmit power of the UE.

Preferred Embodiment 7

Figure 3:
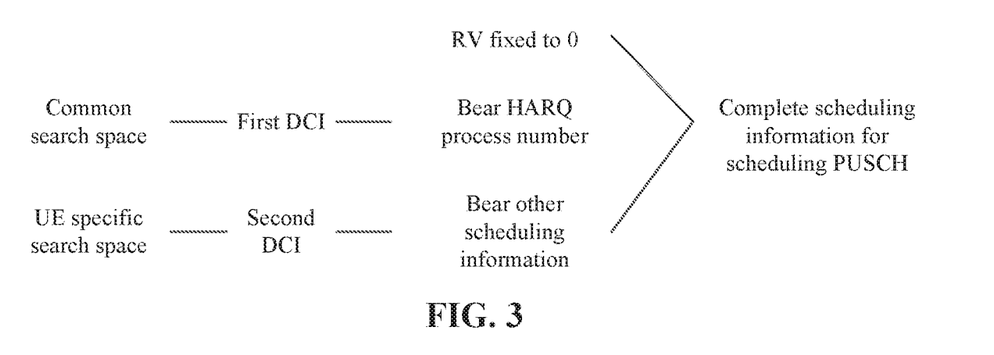
FIG. 3 is a structural diagram 1 of DCI information according to a preferred embodiment of the present disclosure.

Below is description of an example of "an uplink system bandwidth of 20 MHz (100 RBs), cross-carrier scheduling, the bit for carrier indicator having 3 bits, scheduling of one uplink transport block, a maximum transmit power of 200 mW (i.e., 23 dBm), sending on only an unlicensed carrier and not on a licensed carrier, and sending 2 DCIs by a base station". FIG. 3 is a structural diagram 1 of DCI information according to a preferred embodiment of the present disclosure.

A base station sends one DCI to a UE in a UE-specific search space on the unlicensed carrier or on the licensed carrier. In FIG. 3, this DCI is a "second DCI".

This DCI includes: a bit for carrier indicator having, a bit for flag for DCI format0/format1a differentiation, a bit for frequency hopping flag having 1 bit, a bit for resource block assignment having 13 bits, a bit for Modulation and Coding Scheme having 5 bits, a bit for new data indicator having 1 bit, a bit for TPC command for scheduled PUSCH having 2 bits, a bit for cyclic shift DM RS and OCC index having 3 bits, a bit for uplink index having 0 bit (that is, no such bit exists), a bit for DAI having 0 bit (that is, no such bit exists), a bit for CSI request having 1 bit or 2 bits, a bit for SRS request having 0 bit or 2 bits, and a bit for resource allocation type having 1 bit.

The base station sends another DCI to the UE in a common search space on the unlicensed carrier or on the licensed carrier. In FIG. 3, this DCI is a "first DCI". This DCI includes 3 bits or 4 bits for a bit for HARQ process number for a single UE or all UEs in a cell. Generally, this DCI includes 3 bits. The HARQ process number is applicable to all unlicensed carriers or licensed carriers (that is, the same HARQ process number is used on all unlicensed carriers or licensed carriers). When the base station does not schedule the PUSCH of the UE (that is, the base station does not send DCI 0/4 and the UE does not detect DCI 0/4), the 3 bits or 4 bits (in the first DCI) for the bit for HARQ process number for the single UE or all UEs in the cell are reserved and have no practical meaning.

The UE always sends one transport block by using a fixed Redundancy Version (for example, Redundancy Version RV 0; RV 0 is used in FIG. 3) or the UE determines a Redundancy Version according to the bit for Modulation and Coding Scheme in the DCI (for example, when the bit for Modulation and Coding Scheme corresponds to a decimal value among 0 to 28, a corresponding Redundancy Version is 0 (RV 0); when the bit for Modulation and Coding Scheme corresponds to a decimal value of 29, the corresponding Redundancy Version is 1 (RV 1); when the bit for Modulation and Coding Scheme corresponds to a decimal value of 30, the corresponding Redundancy Version is 2 (RV 2); and when the bit for Modulation and Coding Scheme corresponds to a decimal value of 31, the corresponding Redundancy Version is 3 (RV 3)).

The UE sends the PUSCH on the unlicensed carrier according to configuration information (system bandwidth, antenna port, transmit power, transmit mode, etc.) of the base station and the 2 DCIs described above by using the Redundancy Version RV 0. The transmit power of the PUSCH does not exceed 200 mW.

It can be seen that this embodiment clarifies how to determine authorization information and how to allocate and indicate the transmit power of the UE.

Preferred Embodiment 8

Below is description of an example of "an uplink system bandwidth of 20 MHz (100 RBs), cross-carrier scheduling, the bit for carrier indicator having 3 bits, scheduling of one uplink transport block, a maximum transmit power of 200 mW (i.e., 23 dBm), and sending on only an unlicensed carrier and not on a licensed carrier".

A base station sends one DCI to a UE on the unlicensed carrier or on the licensed carrier.

This DCI includes: a bit for carrier indicator having 3 bits, a bit for flag for DCI format0/format1A differentiation having 1 bit, a bit for frequency hopping flag having 1 bit, a bit for resource block assignment having 13 bits, a bit for Modulation and Coding Scheme having 5 bits, a bit for new data indicator having 1 bit, a bit for TPC command for scheduled PUSCH having 2 bits, a bit for cyclic shift for DM RS and OCC index having 3 bits, a bit for uplink index having 0 bit (that is, no such bit exists), a bit for DAI having 0 bit (that is, no such bit exists), a bit for CSI request having 1 bit or 2 bits, a bit for SRS request having 0 bit or 1 bit, and a bit for resource allocation type having 1 bit.

As shown in FIG. 1, the bit for cyclic shift for DM RS and OCC index is used for indicating an HARQ process number. The 3 bits of the bit for cyclic shift for DM RS and OCC index correspond to a decimal value of the HARQ process number. In this case, the cyclic shift for DM RS and OCC index is fixed to 0 (or a value among 0 to 7).

TABLE 1

| Decimal Value Corresponding to Bit for Cyclic Shift for DM RS and OCC Index | Bit for Cyclic Shift for DM RS and OCC Index (Binary) | Bit for Cyclic Shift for DM RS and OCC Index (cyclicShift) | HARQ Process Number |
|---|---|---|---|
| 0 | 000 | 0 | 0 |
| 1 | 001 | 0 | 1 |
| 2 | 010 | 0 | 2 |
| 3 | 011 | 0 | 3 |
| 4 | 100 | 0 | 4 |
| 5 | 101 | 0 | 5 |
| 6 | 110 | 0 | 6 |
| 7 | 111 | 0 | 7 |

In an embodiment, as shown in Table 2, 2 most significant bits or 2 least significant bits among the 3 bits of the bit for cyclic shift for DM RS and OCC index correspond to the decimal value of the HARQ process number (the HARQ process number occupies the 2 least significant bits in the table below). In this case, the cyclic shift for DM RS and OCC index may be 0 or 1 (the cyclic shift occupies the 1 most significant bit in the table below).

TABLE 2

| Decimal Value Corresponding to Bit for Cyclic Shift for DM RS and OCC Index | Bit for Cyclic Shift for DM RS and OCC Index (Binary) | Bit for Cyclic Shift for DM RS and OCC Index (cyclicShift) | HARQ Process Number |
|---|---|---|---|
| 0 | 000 | 0 | 0 |
| 1 | 001 | 0 | 1 |
| 2 | 010 | 0 | 2 |
| 3 | 011 | 0 | 3 |
| 4 | 100 | 1 | 0 |
| 5 | 101 | 1 | 1 |
| 6 | 110 | 1 | 2 |
| 7 | 111 | 1 | 3 |

In an embodiment, as shown in Table 3, 1 most significant bit or 1 least significant bit among the 3 bits of the bit for cyclic shift for DM RS and OCC index corresponds to the decimal value of the HARQ process number (the HARQ process number occupies the 2 least significant bits or the 1 most significant bit in the table below). In this case, the cyclic shift for DM RS and OCC index may be 0 or 1 (the cyclic shift occupies the 2 least significant bits in the table below).

TABLE 3

| Decimal Value Corresponding to Bit for Cyclic Shift for DM RS and OCC Index | Bit for Cyclic Shift for DM RS and OCC Index (Binary) | Bit for Cyclic Shift for DM RS and OCC Index (cyclicShift) | HARQ Process Number |
|---|---|---|---|
| 0 | 000 | 0 | 0 |
| 1 | 001 | 1 | 0 |
| 2 | 010 | 2 | 0 |
| 3 | 011 | 3 | 0 |
| 4 | 100 | 0 | 1 |
| 5 | 101 | 1 | 1 |
| 6 | 110 | 2 | 1 |
| 7 | 111 | 3 | 1 |

The UE always sends one transport block by using a fixed Redundancy Version (for example, Redundancy Version RV 0); or, the UE determines a Redundancy Version according to the bit for Modulation and Coding Scheme in the DCI (for example, when the bit for Modulation and Coding Scheme corresponds to a decimal value among 0 to 28, a corresponding Redundancy Version is 0 (RV 0); when the bit for Modulation and Coding Scheme corresponds to a decimal value of 29, the corresponding Redundancy Version is 1 (RV 1); when the bit for Modulation and Coding Scheme corresponds to a decimal value of 30, the corresponding Redundancy Version is 2 (RV 2); and when the bit for Modulation and Coding Scheme corresponds to a decimal value of 31, the corresponding Redundancy Version is 3 (RV 3)).

The UE sends the PUSCH on the unlicensed carrier according to configuration information (system bandwidth, antenna port, transmit power, transmit mode, etc.) of the base station and the DCI by using the Redundancy Version RV 0. The transmit power of the PUSCH does not exceed 200 mW.

It can be seen that this embodiment clarifies how to determine authorization information and how to allocate and indicate the transmit power of the UE.

Preferred Embodiment 9

Below is description of an example of "an uplink system bandwidth of 20 MHz (100 RBs), cross-carrier scheduling, the bit for carrier indicator having 3 bits, 2 uplink transmit antenna ports, scheduling of 2 uplink transport blocks (the 2 TBs each has an MCS greater than 0, that is, will not be prohibited), a maximum transmit power of 200 mW (i.e., 23 dBm), and sending on only an unlicensed carrier and not on a licensed carrier".

A base station sends one DCI to a UE on the unlicensed carrier or on the licensed carrier.

The DCI includes: a bit for carrier indicator having 3 bits, a bit for resource block assignment having 14 bits, a bit for TPC command for scheduled PUSCH having 2 bits and used for indicating a change in transmit power of the PUSCH, a bit for cyclic shift for DM RS and OCC index having 3 bits, a bit for uplink index having 0 bit (that is, no such bit exists), a bit for DAI having 0 bit (that is, no such bit exists), a bit for CSI request having 2 bits (whose meaning is described in the next paragraph), a bit for SRS request having 2 bits (whose meaning is described in the next paragraph), a bit for resource allocation type having 1 bit, a bit for Modulation and Coding Scheme for a first transport block having 5 bits, a bit for new data indicator for the first transport block having 1 bit, a bit for Modulation and Coding Scheme for a second transport block having 5 bits, a bit for new data indicator for the second transport block having 1 bit, and a bit for precoding information and number of transmission layers having 3 bits.

As shown in Table 4, the bit for precoding information and number of transmission layers is used for indicating an HARQ process number. The 3 bits of the bit for precoding information and number of transmission layers correspond to the decimal value of the HARQ process number. In this case, the precoding information and number of transmission layers (TPMI) is fixed to 0 (or a value among 0 to 7).

TABLE 4

| Decimal Value Corresponding to Bit for Precoding Information and number of transmission layers | Bit for Precoding Information and number of transmission layers (Binary) | Precoding Information and number of transmission layers (TPMI) | HARQ Process Number |
|---|---|---|---|
| 0 | 000 | 0 | 0 |
| 1 | 001 | 0 | 1 |
| 2 | 010 | 0 | 2 |
| 3 | 011 | 0 | 3 |
| 4 | 100 | 0 | 4 |
| 5 | 101 | 0 | 5 |
| 6 | 110 | 0 | 6 |
| 7 | 111 | 0 | 7 |

In an embodiment, as shown in Table 5, 2 most significant bits or 2 least significant bits among the 3 bits of the bit for precoding information and number of transmission layers correspond to the decimal value of the HARQ process number (the HARQ process number occupies the 2 least significant bits in the table below). In this case, the precoding information and number of transmission layers (TPMI) may be 0 or 1 (the precoding information and number of transmission layers (TPMI) occupies the 1 most significant bit in the table below).

TABLE 5

| Decimal Value Corresponding to Bit for Precoding Information and Number of transmission layers | Bit for Precoding Information and Number of transmission layers (Binary) | Precoding Information and Number of transmission layers (TPMI) | HARQ Process Number |
|---|---|---|---|
| 0 | 000 | 0 | 0 |
| 1 | 001 | 0 | 1 |
| 2 | 010 | 0 | 2 |
| 3 | 011 | 0 | 3 |
| 4 | 100 | 1 | 0 |
| 5 | 101 | 1 | 1 |
| 6 | 110 | 1 | 2 |
| 7 | 111 | 1 | 3 |

The UE always sends two transport blocks by using a fixed Redundancy Version (for example, Redundancy Version RV 0); or, the UE determines a Redundancy Version according to the bit for the Modulation and Coding Scheme in the DCI (for example, when the bit for Modulation and Coding Scheme corresponds to a decimal value among 0 to 28, a corresponding Redundancy Version is 0 (RV 0); when the bit for Modulation and Coding Scheme corresponds to a decimal value of 29, the corresponding Redundancy Version is 1 (RV 1); when the bit for Modulation and Coding Scheme corresponds to a decimal value of 30, the corresponding Redundancy Version is 2 (RV 2); and when the bit for Modulation and Coding Scheme corresponds to a decimal value of 31, the corresponding Redundancy Version is 3 (RV 3)).

The UE sends the PUSCH on the unlicensed carrier according to configuration information (system bandwidth, antenna port, transmit power, transmit mode, etc.) of the base station and the DCI by using the Redundancy Version RV 0. The transmit power of the PUSCH does not exceed 200 mW.

It can be seen that this embodiment clarifies how to determine authorization information and how to allocate and indicate the transmit power of the UE.

Preferred Embodiment 10

Below is description of an example of "an uplink system bandwidth of 20 MHz (100 RBs), cross-carrier scheduling, the bit for carrier indicator having 3 bits, 2 uplink transmit antenna ports, scheduling of 2 uplink transport blocks (the 2 TBs each has an MCS greater than 0, that is, will not be prohibited), a maximum transmit power of 200 mW (i.e., 23 dBm), and sending on only an unlicensed carrier and not on a licensed carrier".

A base station sends one DCI to a UE on the unlicensed carrier or on the licensed carrier.

The DCI includes: a bit for carrier indicator having 3 bits, a bit for resource block assignment having 14 bits, a bit for TPC command for scheduled PUSCH having 2 bits and used for indicating a change in transmit power of the PUSCH, a bit for cyclic shift for DM RS and OCC index having 3 bits, a bit for uplink index having 0 bit (that is, no such bit exists), a bit for DAI having 0 bit (that is, no such bit exists), a bit for CSI request having 1 bit, 2 bits or 3 bits (whose meaning is described in the next paragraph), a bit for SRS request having 2 bits (whose meaning is described in the next paragraph), a bit for resource allocation type having 1 bit, a bit for Modulation and Coding Scheme for a first transport block having 5 bits, a bit for new data indicator for the first transport block having 1 bit, a bit for Modulation and Coding Scheme for a second transport block having 5 bits, a bit for new data indicator for the second transport block having 1 bit, and a bit for precoding information and number of transmission layers having 3 bits.

As shown in Tables 6, 7 and 8, the bit for CSI request is used for indicating an HARQ process number. The bit for CSI request having 1 bit, 2 bits or 3 bits corresponds to a decimal value of the HARQ process number. In this case, the CSI request is fixed to 0 (or a value among 0 to 7).

TABLE 6

| Decimal Value Corresponding to 1 Bit for CSI Request | 1 Bit for CSI Request (Binary) | CSI Request | HARQ Process Number |
|---|---|---|---|
| 0 | 0 | 0 | 0 |
| 1 | 1 | 0 | 1 |

TABLE 7

| Decimal Value Corresponding to 2 Bits for CSI Request | 2 Bits for CSI Request (Binary) | CSI Request | HARQ Process Number |
|---|---|---|---|
| 0 | 00 | 0 | 0 |
| 1 | 01 | 0 | 1 |
| 2 | 10 | 0 | 2 |
| 3 | 11 | 0 | 3 |

TABLE 8

| Decimal Value Corresponding to 3 Bits for CSI Request | 3 Bits for CSI Request (Binary) | CSI Request | HARQ Process Number |
|---|---|---|---|
| 0 | 000 | 0 | 0 |
| 1 | 001 | 0 | 1 |
| 2 | 010 | 0 | 2 |
| 3 | 011 | 0 | 3 |
| 4 | 100 | 0 | 4 |
| 5 | 101 | 0 | 5 |
| 6 | 110 | 0 | 6 |
| 7 | 111 | 0 | 7 |

The UE always sends two transport blocks by using a fixed Redundancy Version (for example, Redundancy Version RV 0); or, the UE determines a Redundancy Version according to the bit for Modulation and Coding Scheme in the DCI (for example, when the bit for Modulation and Coding Scheme corresponds to a decimal value among 0 to 28, a corresponding Redundancy Version is 0 (RV 0); when the bit for Modulation and Coding Scheme corresponds to a decimal value of 29, the corresponding Redundancy Version is 1 (RV 1); when the bit for Modulation and Coding Scheme corresponds to a decimal value of 30, the corresponding Redundancy Version is 2 (RV 2); and when the bit for Modulation and Coding Scheme corresponds to a decimal value of 31, the corresponding Redundancy Version is 3 (RV 3)).

The UE sends the PUSCH on the unlicensed carrier according to configuration information (system bandwidth, antenna port, transmit power, transmit mode, etc.) of the base station and the DCI by using the Redundancy Version RV 0. The transmit power of the PUSCH does not exceed 200 mW.

It can be seen that this embodiment clarifies how to determine authorization information and how to allocate and indicate the transmit power of the UE.

Preferred Embodiment 11

Below is description of an example of "an uplink system bandwidth of 20 MHz (100 RBs), cross-carrier scheduling, the bit for carrier indicator having 3 bits, 2 uplink transmit antenna ports, scheduling of 2 uplink transport blocks (the 2 TBs each has an MCS greater than 0, that is, will not be prohibited), a maximum transmit power of 200 mW (i.e., 23 dBm), sending on only an unlicensed carrier and not on a licensed carrier, and supporting cross-carrier retransmission by a UE".

A base station sends one DCI to the UE on the unlicensed carrier or on the licensed carrier.

The DCI includes: a bit for carrier indicator having 6 bits (whose meaning is described in the next paragraph), a bit for resource block assignment having 14 bits, a bit for HARQ process number having 3 bits, a bit for TPC command for scheduled PUSCH having 2 bits and used for indicating a change in transmit power of the PUSCH, a bit for cyclic shift for DM RS and OCC index having 3 bits, a bit for uplink index having 0 bit (that is, no such bit exists), a bit for DAI having 0 bit (that is, no such bit exists), a bit for CSI request having 1 bit, 2 bits or 3 bits (whose meaning is described in the next paragraph), a bit for SRS request having 2 bits, a bit for resource allocation type having 1 bit, a bit for Modulation and Coding Scheme for a first transport block having 5 bits, a bit for new data indicator for the first transport block having 1 bit, a bit for Modulation and Coding Scheme for a second transport block having 5 bits, a bit for new data indicator for the second transport block having 1 bit, and a bit for precoding information and number of transmission layers having 3 bits.

Among the 6 bits of the bit for carrier indicator, the 3 least significant bits represent a serving cell index of a destination carrier, the 3 most significant bits represent a serving cell index of a source carrier. Data (PUSCH/PDSCH) of the source carrier are retransmitted on the destination carrier during the cross-carrier retransmission.

The UE always sends two transport blocks by using a fixed Redundancy Version (for example, Redundancy Version RV 0); or, the UE determines a Redundancy Version according to the bit for Modulation and Coding Scheme in the DCI (for example, when the bit for Modulation and Coding Scheme corresponds to a decimal value among 0 to 28, a corresponding Redundancy Version is 0 (RV 0); when the bit for Modulation and Coding Scheme corresponds to a decimal value of 29, the corresponding Redundancy Version is 1 (RV 1); when the bit for Modulation and Coding Scheme corresponds to a decimal value of 30, the corresponding Redundancy Version is 2 (RV 2); and when the bit for Modulation and Coding Scheme corresponds to a decimal value of 31, the corresponding Redundancy Version is 3 (RV 3)).

The UE sends the PUSCH on the unlicensed carrier according to configuration information (system bandwidth, antenna port, transmit power, transmit mode, etc.) of the base station and the DCI by using the Redundancy Version RV 0. The transmit power of the PUSCH does not exceed 200 mW.

It can be seen that this embodiment clarifies how to determine authorization information and how to allocate and indicate the transmit power of the UE.

Preferred Embodiment 12

Below is description of an example of "an uplink system bandwidth of 20 MHz (100 RBs), cross-carrier scheduling, the bit for carrier indicator having 3 bits, 2 uplink transmit antenna ports, scheduling of 2 uplink transport blocks (the 2 TBs each has an MCS greater than 0, that is, will not be prohibited), a maximum transmit power of 200 mW (i.e., 23 dBm), sending on only an unlicensed carrier and not on a licensed carrier, and supporting cross-carrier retransmission by a UE".

A base station sends one DCI to the UE on the unlicensed carrier or on the licensed carrier.

The DCI includes: a bit for carrier indicator having 3 bits (whose meaning is described in the next paragraph), a bit for resource block assignment having 14 bits, a bit for HARQ process number having 3 bits, a bit for TPC command for scheduled PUSCH having 2 bits and used for indicating a change in transmit power of the PUSCH, a bit for cyclic shift for DM RS and OCC index having 3 bits, a bit for uplink index having 0 bit (that is, no such bit exists), a bit for DAI having 0 bit (that is, no such bit exists), a bit for CSI request having 1 bit, 2 bits or 3 bits (whose meaning is described in the next paragraph), a bit for SRS request having 2 bits, a bit for resource allocation type having 1 bit, a bit for Modulation and Coding Scheme for a first transport block having 5 bits, a bit for new data indicator for the first transport block having 1 bit, a bit for Modulation and Coding Scheme for a second transport block having 5 bits, a bit for new data indicator for the second transport block having 1 bit, and a bit for precoding information and number of transmission layers having 3 bits.

The bit for carrier indicator having 3 bits is a serving cell index of a destination carrier. The bit for CSI request and the bit for SRS request are concatenated to indicate a serving cell index of a source carrier. Data (PUSCH/PDSCH) of the source carrier are retransmitted on the destination carrier during the cross-carrier retransmission.

The UE always sends two transport blocks by using a fixed Redundancy Version (for example, Redundancy Version RV 0) or the UE determines a Redundancy Version according to the bit for Modulation and Coding Scheme in the DCI (for example, when the bit for Modulation and Coding Scheme corresponds to a decimal value among 0 to 28, a corresponding Redundancy Version is 0 (RV 0); when the bit for Modulation and Coding Scheme corresponds to a decimal value of 29, the corresponding Redundancy Version is 1 (RV 1); when the bit for Modulation and Coding Scheme corresponds to a decimal value of 30, the corresponding Redundancy Version is 2 (RV 2); and when the bit for Modulation and Coding Scheme corresponds to a decimal value of 31, the corresponding Redundancy Version is 3 (RV 3)).

The UE sends the PUSCH on the unlicensed carrier according to configuration information (system bandwidth, antenna port, transmit power, transmit mode, etc.) of the base station and the DCI by using the Redundancy Version RV 0. The transmit power of the PUSCH does not exceed 200 mW.

It can be seen that this embodiment clarifies how to determine authorization information and how to allocate and indicate the transmit power of the UE.

Preferred Embodiment 13

Figure 4:
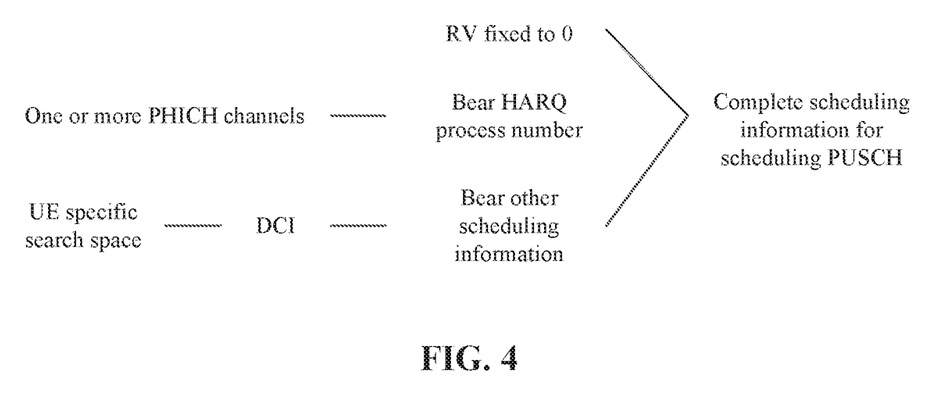
FIG. 4 is a structural diagram 2 of DCI information according to a preferred embodiment of the present disclosure.

Below is description of an example of "an uplink system bandwidth of 20 MHz (100 RBs), cross-carrier scheduling, the bit for carrier indicator having 3 bits, scheduling of one uplink transport block, a maximum transmit power of 200 mW (i.e., 23 dBm), sending on only an unlicensed carrier and not on a licensed carrier, sending one DCI by a base station, sending 3 PHICHs by the base station, an Ng value of 1/6, and a cell number $N_{ID}^{cell}$ of 137" as shown in FIG. 4. FIG. 4 is a structural diagram 2 of DCI information according to a preferred embodiment of the present disclosure.

The base station sends one DCI to a UE in a UE-specific search space on the unlicensed carrier or on the licensed carrier. In FIG. 4, this DCI is "DCI" in the figure.

This DCI includes: a bit for carrier indicator having 3 bits, a bit for flag for DCI format0/format1A differentiation having 1 bit, a bit for frequency hopping flag having 1 bit, a for resource block assignment having 13 bits, a bit for Modulation and Coding Scheme having 5 bits, a bit for new data indicator having 1 bit, a bit for TPC command for scheduled PUSCH having 2 bits, a bit for cyclic shift for DM RS and OCC index having 3 bits, a bit for uplink index having 0 bit (that is, no such bit exists), a bit for DAI having 0 bit (that is, no such bit exists), a bit for CSI request having 1 bit or 2 bits, a bit for SRS request having 0 bit or 1 bit, and a bit for resource allocation type having 1 bit.

The base station sends 3 PHICHs to the UE in a control area on the unlicensed carrier or on the licensed carrier. FIG. 4 shows "one or more PHICHs". These PHICHs include a bit for HARQ process number having 3 bits for a single UE or all UEs in a cell. This HARQ process number is applicable to all unlicensed carriers or licensed carriers (that is, the same HARQ process number is used on all unlicensed carriers or licensed carriers).

An Mth bit of the HARQ process number is carried on a PHICH having a channel number $n_{PHICH}^{Seq}=(N_{ID}^{cell}+M-1) \mod(2 \cdot N_{SF}^{PHICH})$ in a PHICH group having a group number $n_{PHICH}^{group}=(N_{ID}^{cell}+M-1) \mod N_{PHICH}^{group}$, $N_{ID}^{cell}$ denotes a cell ID, mod denotes a modulo operation (a former number modulo a latter number), M is a positive integer, $N_{SF}^{PHICH}$ denotes a spreading factor of the PHICH, a value of $N_{SF}^{PHICH}$ is 4 here, $N_{PHICH}^{group}$ denotes a number of PHICHs, $N_{PHICH}^{group}=\text{Ceil}(N_g \cdot (N_{RB}^{DL}/8))=3$, Ceil( ) denotes a ceiling operation (taking the smallest integer greater than or equal to this number), Ng is a parameter (configuration information) configured by the base station, a value of Ng is 1/6 here, $N_{RB}^{DL}$ denotes a downlink system bandwidth (configuration information) in units of resource blocks, and a value of $N_{RB}^{DL}$ is 100. In this way, the first bit, the second bit and the third bit of the HARQ process number are carried on a PHICH having a channel number of 1 in a PHICH group having a group number of 2, a PHICH having a channel number of 2 in a PHICH group having a group number of 0, and a PHICH having a channel number of 3 in a PHICH group having a group number of 1, respectively. A value of $N_{ID}^{cell}$ is a Cell Radio Network Temporary Identifier (C-RNTI) of the UE when the HARQ process number is directed at the single UE.

In addition, more PHICHs may be sent repeatedly to improve the performance of the HARQ process number.

The UE always sends one transport block by using a fixed Redundancy Version (for example, Redundancy Version RV 0; RV 0 is used in FIG. 3); or, the UE determines a Redundancy Version according to the bit for Modulation and Coding Scheme in the DCI (for example, when the bit for Modulation and Coding Scheme corresponds to a decimal value among 0 to 28, a corresponding Redundancy Version is 0 (RV 0); when the bit for Modulation and Coding Scheme corresponds to a decimal value of 29, the corresponding Redundancy Version is 1 (RV 1); when the bit for Modulation and Coding Scheme corresponds to a decimal value of 30, the corresponding Redundancy Version is 2 (RV 2); and when the bit for Modulation and Coding Scheme corresponds to a decimal value of 31, the corresponding Redundancy Version is 3 (RV 3)).

The UE sends the PUSCH on the unlicensed carrier according to configuration information (system bandwidth, antenna port, transmit power, transmit mode, Ng, cell number $N_{ID}^{cell}$, etc.) of the base station, the DCI and the PHICH by using the Redundancy Version RV 0. The transmit power of the PUSCH does not exceed 200 mW.

It can be seen that this embodiment clarifies how to determine authorization information and how to allocate and indicate the transmit power of the UE.

From the description of the embodiments described above, it will be apparent to those skilled in the art that the method of any embodiment described above may be implemented by use of software plus a necessary general-purpose hardware platform, or may of course be implemented by hardware. However, in many cases, the former is a preferred implementation mode. Based on this understanding, the present disclosure substantially, or the part contributing to the related art, may be embodied in the form of a software product. The software product is stored on a storage medium (such as a ROM/RAM, a magnetic disk or an optical disk) and includes several instructions for enabling a terminal device (which may be a mobile phone, a computer, a server or a network device) to execute the method according to each embodiment of the present disclosure.

The various modules described above may be implemented by software or hardware. Implementation by hardware may, but may not necessarily, be performed by the following method: The various modules described above are located in a same processor or respective processors.

Embodiments of the present disclosure further provide a storage medium. In this embodiment, the storage medium may be configured to store program codes for executing the steps described below.

In S1, a User Equipment (UE) receives Downlink Control Information (DCI) sent by a base station.

In S2, the UE sends an uplink channel or/and an uplink signal and determines transmit power of the channel or/and the signal according to configuration information of the base station and the DCI.

Optionally, the storage medium is further configured to store program codes for executing the steps in the methods described in the above embodiments.

In an embodiment, the storage medium may include, but are not limited to, a U disk, a read-only memory (ROM), a random access memory (RAM), a mobile hard disk, a magnetic disk, an optical disk or another medium capable of storing program codes.

In an embodiment, the processor executes the steps in the methods described in the above embodiments according to the program codes stored in the storage medium.

In an embodiment, reference may be made to the examples described in the above embodiments and optional implementation modes, and the specific examples will not be repeated in this embodiment.

Apparently, those skilled in the art should know that each above-mentioned modules or steps of the present disclosure may be implemented by a universal computing device, they may be integrated in a single computing device or distributed in a network formed by multiple computing devices. In an embodiment, they may be implemented by program codes executable by the computing devices, so that they may be stored in a storage device for execution by the computing devices, and in some circumstances, the illustrated or described steps may be executed in sequences different from those described herein, or they may be made into various integrated circuit modules separately, or multiple modules or steps therein may be made into a single integrated circuit module for implementation. Therefore, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure are within the scope of the present disclosure.

INDUSTRIAL APPLICABILITY

The present disclosure is applicable to uplink scheduling. According to the present disclosure, a UE receives DCI sent by a base station, and the UE sends an uplink channel or/and an uplink signal and determines transmit power of the channel or/and the signal according to configuration information of the base station and the DCI. This has better performance in authorization information determination and transmit power allocation and indication and improves the Licensed Assisted Access.

What is claimed is:

1. A uplink scheduling method, comprising:

operating a User Equipment (UE) to receive Downlink Control Information (DCI) sent by a base station; and operating the UE to send an uplink channel or/and an uplink signal and determine transmit power of the channel or/and the signal according to configuration information of the base station and the DCI, wherein the method is performed by at least one processor;

wherein the DCI comprises: a bit for Redundancy Version;

wherein a Redundancy Version RV 0 and a Redundancy Version RV 2 are used by the UE to send a Physical Uplink Shared Channel (PUSCH), wherein a Redundancy Version (2×Bit_RV) is used, and Bit_RV denotes a value of the bit for Redundancy Version.

2. The method of claim 1, wherein the DCI comprises:

a bit for carrier indicator, a bit for flag for DCI format0/format1A differentiation, a bit for frequency hopping flag, a bit for resource block assignment, a bit for Modulation and Coding Scheme, a bit for Hybrid Automatic Repeat Request (HARQ) process number, a bit for new data indicator, a bit for Transmit Power Control (TPC) command for scheduled PUSCH, a bit for cyclic shift for Demodulation Reference Signal (DM RS) and Orthogonal Cover Code (OCC) index, a bit for uplink index, a bit for Downlink Assignment Index (DAI), the bit for Channel State Information (CSI) request, a bit for Sounding Reference Symbol (SRS) request, and a bit for resource allocation type; or the bit for carrier indicator, the bit for flag for DCI format0/format1A differentiation, the bit for frequency hopping flag, the bit for resource block assignment, the bit for Modulation and Coding Scheme, the bit for HARQ process number, the bit for new data indicator, the bit for TPC command for scheduled PUSCH, the bit for cyclic shift for DM RS and OCC index, and the bit for resource allocation type; or the bit for carrier indicator, the bit for flag for DCI format0/format1A differentiation, the bit for frequency hopping flag, the bit for resource block assignment, the bit for Modulation and Coding Scheme, the bit for HARQ process number, the bit for new data indicator, the bit for TPC command for scheduled PUSCH, the bit for cyclic shift for DM RS and OCC index, the bit for resource allocation type, a bit for whether the SRS and the PUSCH are sent simultaneously, a bit for whether a Physical Uplink Control Channel (PUCCH) and the PUSCH are sent simultaneously, a bit for TPC command for the PUCCH in simultaneous sending of the PUCCH and the PUSCH, a bit for whether a Physical Random Access Channel (PRACH) and the PUSCH are sent simultaneously, and a bit for differentiation from DCI format 0.

3. An uplink scheduling apparatus, disposed in a User Equipment (UE), comprising:
a receiving module, which is configured to receive Downlink Control Information (DCI) sent by a base station; and
a sending module, which is configured to send an uplink channel or/and an uplink signal and determine transmit power of the channel or/and the signal according to configuration information of the base station and the DCI;
wherein the DCI comprises: a bit for Redundancy Version;
wherein a Redundancy Version RV 0 and a Redundancy Version RV 2 are used by the UE to send a Physical Uplink Shared Channel (PUSCH), wherein a Redundancy Version (2×Bit_RV) is used, and Bit_RV denotes a value of the bit for Redundancy Version.

4. The apparatus of claim 3, wherein the DCI comprises:
a bit for carrier indicator, a bit for flag for DCI format0/format1A differentiation, a bit for frequency hopping flag, a bit for resource block assignment, a bit for Modulation and Coding Scheme, a bit for Hybrid Automatic Repeat Request (HARQ) process number, a bit for new data indicator, a bit for Transmit Power Control (TPC) command for scheduled PUSCH, a bit for cyclic shift for Demodulation Reference Signal (DM RS) and Orthogonal Cover Code (OCC) index, a bit for uplink index, a bit for Downlink Assignment Index (DAI), the bit for Channel State Information (CSI) request, a bit for Sounding Reference Symbol (SRS) request, and a bit for resource allocation type; or
the bit for carrier indicator, the bit for flag for DCI format0/format1A differentiation, the bit for frequency hopping flag, the bit for resource block assignment, the bit for Modulation and Coding Scheme, the bit for HARQ process number, the bit for new data indicator, the bit for TPC command for scheduled PUSCH, the bit for cyclic shift for DM RS and OCC index, and the bit for resource allocation type; or
the bit for carrier indicator, the bit for flag for DCI format0/format1A differentiation, the bit for frequency hopping flag, the bit for resource block assignment, the bit for Modulation and Coding Scheme, the bit for HARQ process number, the bit for new data indicator, the bit for TPC command for scheduled PUSCH, the bit for cyclic shift for DM RS and OCC index, the bit for resource allocation type, a bit for whether the SRS and the PUSCH are sent simultaneously, a bit for whether a Physical Uplink Control Channel (PUCCH) and the PUSCH are sent simultaneously, a bit for TPC command for the PUCCH in simultaneous sending of the PUCCH and the PUSCH, a bit for whether a Physical Random Access Channel (PRACH) and the PUSCH are sent simultaneously, and a bit for differentiation from DCI format 0.

5. A non-transitory computer readable medium having stored thereon instructions which when executed by a processor perform a method comprising:
operating a User Equipment (UE) to receive Downlink Control Information (DCI) sent by a base station; and
operating the UE to send an uplink channel or/and an uplink signal and determine transmit power of the channel or/and the signal according to configuration information of the base station and the DCI;
wherein the DCI comprises: a bit for Redundancy Version;
wherein a Redundancy Version RV 0 and a Redundancy Version RV 2 are used by the UE to send a Physical Uplink Shared Channel (PUSCH), wherein a Redundancy Version (2×Bit_RV) is used, and Bit_RV denotes a value of the bit for Redundancy Version.

6. The medium of claim 5, wherein the DCI comprises:
a bit for carrier indicator, a bit for flag for DCI format0/format1A differentiation, a bit for frequency hopping flag, a bit for resource block assignment, a bit for Modulation and Coding Scheme, a bit for Hybrid Automatic Repeat Request (HARQ) process number, a bit for new data indicator, a bit for Transmit Power Control (TPC) command for scheduled PUSCH, a bit for cyclic shift for Demodulation Reference Signal (DM RS) and Orthogonal Cover Code (OCC) index, a bit for uplink index, a bit for Downlink Assignment Index (DAI), the bit for Channel State Information (CSI) request, a bit for Sounding Reference Symbol (SRS) request, and a bit for resource allocation type; or
the bit for carrier indicator, the bit for flag for DCI format0/format1A differentiation, the bit for frequency hopping flag, the bit for resource block assignment, the bit for Modulation and Coding Scheme, the bit for HARQ process number, the bit for new data indicator, the bit for TPC command for scheduled PUSCH, the bit for cyclic shift for DM RS and OCC index, and the bit for resource allocation type; or
the bit for carrier indicator, the bit for flag for DCI format0/format1A differentiation, the bit for frequency hopping flag, the bit for resource block assignment, the bit for Modulation and Coding Scheme, the bit for HARQ process number, the bit for new data indicator, the bit for TPC command for scheduled PUSCH, the bit for cyclic shift for DM RS and OCC index, the bit for resource allocation type, a bit for whether the SRS and the PUSCH are sent simultaneously, a bit for whether a Physical Uplink Control Channel (PUCCH) and the PUSCH are sent simultaneously, a bit for TPC command for the PUCCH in simultaneous sending of the PUCCH and the PUSCH, a bit for whether a Physical Random Access Channel (PRACH) and the PUSCH are sent simultaneously, and a bit for differentiation from DCI format 0.

* * * * *